US012639414B2

(12) United States Patent
Larri

(10) Patent No.: US 12,639,414 B2
(45) Date of Patent: May 26, 2026

(54) AUTHENTICATION CODE GENERATION/CHECKING INSTRUCTIONS

(71) Applicant: Arm Limited, Cambridge (GB)

(72) Inventor: Guy Larri, Cambridge (GB)

(73) Assignee: Arm Limited, Cambridge (GB)

( * ) Notice: Subject to any disclaimer, the term of this patent is extended or adjusted under 35 U.S.C. 154(b) by 384 days.

(21) Appl. No.: 18/005,150

(22) PCT Filed: Jun. 23, 2021

(86) PCT No.: PCT/GB2021/051595
§ 371 (c)(1),
(2) Date: Jan. 11, 2023

(87) PCT Pub. No.: WO2022/013521
PCT Pub. Date: Jan. 20, 2022

(65) Prior Publication Data
US 2023/0259605 A1 Aug. 17, 2023

(30) Foreign Application Priority Data
Jul. 16, 2020 (GB) ..................................... 2010952

(51) Int. Cl.
*G06F 21/44* (2013.01)
*G06F 9/30* (2018.01)
(Continued)

(52) U.S. Cl.
CPC .......... *G06F 21/44* (2013.01); *G06F 9/30054* (2013.01); *G06F 9/323* (2023.08);
(Continued)

(58) Field of Classification Search
CPC ...... G06F 21/44; G06F 9/323; G06F 9/30054; G06F 9/38; G06F 21/52; G06F 21/554; G06F 21/71; G06F 2221/034
See application file for complete search history.

(56) References Cited

U.S. PATENT DOCUMENTS 10,409,600 B1 9/2019 Sierra et al.
10,740,452 B2 * 8/2020 Hosie ...................... G06F 21/42
(Continued)

FOREIGN PATENT DOCUMENTS

WO 2019/053396 A1 3/2019

OTHER PUBLICATIONS

Robert Bedichek, "Some Efficient Architecture Simulation Techniques", Department of Computer Science, FR-35 University of Washington, Seattle, Washington 98195, 1990.
(Continued)

*Primary Examiner* — Techane Gergiso
(74) *Attorney, Agent, or Firm* — NIXON & VANDERHYE P.C.

(57) ABSTRACT

An apparatus comprises processing circuitry to execute instructions, and decode circuitry to decode the instructions for execution by the processing circuitry. The decode circuitry is responsive to an authentication code generation instruction specifying a first source value to control the processing circuitry to generate an authentication code dependent on the first source value, and store the authentication code to a memory location associated with a store address formed using a value obtained from a register. By providing a single instruction, this reduces register pressure enabling improved performance by avoiding unnecessary load/store operations, and makes compilation of code using the authentication code generation instruction simpler. Because it does not store the result of the cryptographic function in the register bank, it also enables simple in-order CPU designs to hide the latency of slow cryptographic computations by allowing subsequent instructions to start executing before the cryptographic computation has completed.

23 Claims, 14 Drawing Sheets

(51) Int. Cl.

| | | |
|---|---|---|
| *G06F 9/32* | (2018.01) |
| *G06F 9/38* | (2018.01) |
| *G06F 21/52* | (2013.01) |
| *G06F 21/55* | (2013.01) |
| *G06F 21/71* | (2013.01) |

(52) U.S. Cl.
CPC ............... *G06F 9/38* (2013.01); *G06F 21/52*
(2013.01); *G06F 21/554* (2013.01); *G06F*
*21/71* (2013.01); *G06F 2221/034* (2013.01)

(56) References Cited

U.S. PATENT DOCUMENTS

| | | | | |
|---|---|---|---|---|
| 11,917,067 | B2 * | 2/2024 | Brandt ................. | H04L 9/0894 |
| 2004/0131186 | A1 * | 7/2004 | Kasuya .............. | H04W 12/037 |
| | | | | 380/255 |
| 2007/0177769 | A1 * | 8/2007 | Motoyama ............ | G06V 40/10 |
| | | | | 382/115 |
| 2009/0132836 | A1 * | 5/2009 | Mera ................. | H04W 52/0229 |
| | | | | 713/310 |
| 2011/0066783 | A1 * | 3/2011 | Konireddygari ........ | G06F 21/71 |
| | | | | 719/321 |
| 2011/0167278 | A1 * | 7/2011 | Goto .................. | G06F 12/1408 |
| | | | | 713/193 |

| | | | | |
|---|---|---|---|---|
| 2015/0264569 | A1 * | 9/2015 | Toyota ............... | H04W 12/069 |
| | | | | 726/7 |
| 2015/0295717 | A1 * | 10/2015 | Brittan ................. | H04L 9/3226 |
| | | | | 713/168 |
| 2016/0380772 | A1 * | 12/2016 | Gopal ................... | H04L 9/3242 |
| | | | | 713/170 |
| 2016/0381050 | A1 | 12/2016 | Shanbhogue et al. | |
| 2017/0147838 | A1 * | 5/2017 | Alon ...................... | G06F 21/64 |
| 2017/0177339 | A1 | 6/2017 | Shanbhogue et al. | |
| 2019/0080096 | A1 * | 3/2019 | Savry ..................... | G06F 21/44 |
| 2019/0087566 | A1 | 3/2019 | Hosie | |
| 2020/0329031 | A1 * | 10/2020 | Hashimoto ............. | G06F 21/32 |
| 2021/0026542 | A1 * | 1/2021 | Carlson .................. | G06F 21/79 |
| 2021/0051020 | A1 * | 2/2021 | Chen ..................... | G06F 3/0622 |
| 2021/0203504 | A1 * | 7/2021 | Brandt ............... | G06F 9/30025 |

OTHER PUBLICATIONS

Arm Limited, "Arm Architecture Reference Manual Armv8, for Armv8-A architecture profile", 2013-2019 Arm Limited, Arm DDI 0487E.a (ID070919).

Roberto Avanzi, "The QARMA Block Cipher Family Almost MDS Matrices Over Rings With Zero Divisors, Nearly Symmetric Even-Mansour Constructions With Non-Involutory Central Rounds, and Search Heuristics for Low-Latency S-Boxes", Qualcomm Product Security, Munich, Germany.

* cited by examiner target address
of subsequent
ld/st instruction

Simulator Implementation

AUTHENTICATION CODE GENERATION/CHECKING INSTRUCTIONS

The present technique relates to the field of data processing.

Some data processing systems may have mechanisms for guarding against certain security exploits. One type of attack is a return-oriented-programming (ROP) attack, in which an attacker attempts to execute unauthorised sections of code by manipulating function return addresses, for example by exploiting a buffer overrun of a buffer stored on the stack. Program functions are also known as subroutines. More particularly, a ROP attack relies on the concept of nested functions, during which the return address of one function may get pushed onto the stack before another function is called. In some architectures, the return address is placed in a link register by the subroutine call instruction, which is often called a "branch and link" or "BL" instruction. The called function then has the option to save the return address to the stack to free up a link register, if it needs to make a nested function call. In a ROP attack, an attacker overwrites the return address in the stack, so that on return from the function, code identified by the attacker is executed, instead of code identified by the original value of the return address.

Viewed from one example of the present technique, there is provided an apparatus comprising: processing circuitry to execute instructions; and decode circuitry to decode the instructions for execution by the processing circuitry; wherein the decode circuitry is responsive to an authentication code generation instruction specifying a first source value to control the processing circuitry to: generate an authentication code dependent on the first source value; and store the authentication code to a memory location associated with a store address formed using a value obtained from a register; and the authentication code generation instruction is a single instruction.

Viewed from another example of the present technique, there is provided a method comprising: in response to an authentication code generation instruction specifying a first source value, controlling processing circuitry to: generate an authentication code dependent on the first source value; and store the authentication code to a memory location associated with a store address formed using a value obtained from a register; wherein the authentication code generation instruction is a single instruction.

Viewed from another example of the present technique, there is provided a computer program to control a host data processing apparatus to provide an instruction execution environment for execution of target code, the computer program comprising: instruction decoding program logic to decode instructions of the target code to control the host data processing apparatus to perform data processing; and register maintenance program logic to maintain a register emulating structure in memory, or in host registers, which emulates registers of a target instruction set architecture of the target code; wherein the instruction decoding program logic is responsive to an authentication code generating instruction to: generate an authentication code dependent on the first source value; and store the authentication code to a memory address associated with a store address in a simulated address space, the store address being formed using a value obtained from the register emulating structure; and wherein the authentication code generation instruction is a single instruction.

Viewed from another example, there is provided an apparatus comprising: processing circuitry to execute instructions; and decode circuitry to decode the instructions for execution by the processing circuitry; wherein the decode circuitry is responsive to an authentication code checking instruction specifying a source value to control the processing circuitry to: read a data value from a memory location associated with a load address formed using a value obtained from a register; generate an expected authentication code dependent on the source value; compare the data value with the expected authentication code; and trigger an error handling response when a mismatch is detected between the data value and the expected authentication code; and wherein the authentication code checking instruction is a single instruction.

Viewed from another example, there is provided a method comprising: in response to an authentication code checking instruction specifying a source value, controlling processing circuitry to: read a data value from a memory location associated with a load address formed using a value obtained from a register; generate an expected authentication code dependent on the source value; compare the data value with the expected authentication code; and trigger an error handling response when a mismatch is detected between the data value and the expected authentication code; wherein the authentication code checking instruction is a single instruction.

Viewed from another example, there is provided a computer program to control a host data processing apparatus to provide an instruction execution environment for execution of target code, the computer program comprising: instruction decoding program logic to decode instructions of the target code to control the host data processing apparatus to perform data processing; and register maintenance program logic to maintain a register emulating structure in memory, or in host registers, which emulates registers of a target instruction set architecture of the target code; wherein the instruction decoding program logic is responsive to an authentication code checking instruction to: read a data value from a memory location associated with a load address in a simulated address space, the load address being formed using a value obtained from the register emulating structure; generate an expected authentication code dependent on the source value; compare the data value with the expected authentication code; and trigger an error handling response when a mismatch is detected between the data value and the expected authentication code; and wherein the authentication code checking instruction is a single instruction.

Further aspects, features and advantages of the present technique will be apparent from the following description of examples, which is to be read in conjunction with the accompanying drawings, in which:

FIG. 1 schematically illustrates an example of a data processing system in which the present technique may be implemented;

FIGS. 2, 3, 4A and 4B schematically illustrate examples of apparatuses for generating and storing authentication codes;

FIG. 5 schematically illustrates an example of an apparatus for checking authentication codes;

FIG. 6 schematically illustrates a buffer for storing authentication codes and associated information;

FIG. 7 schematically illustrates another example of a data processing system in which the present technique may be implemented;

Figure 12:
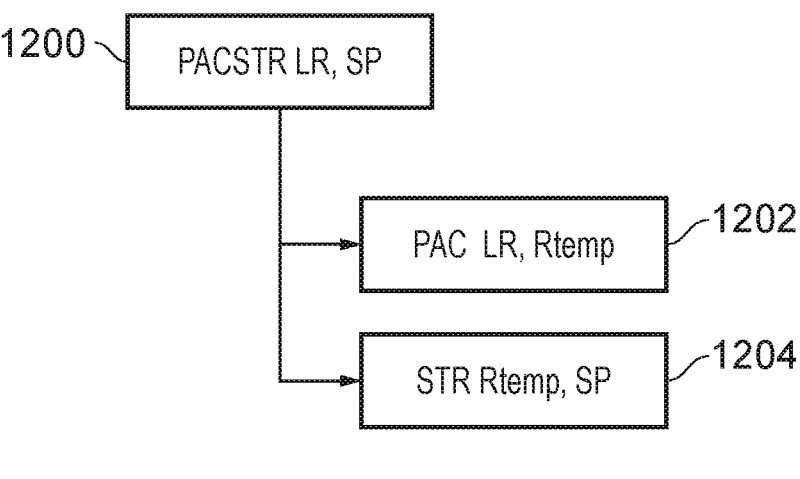
Figure 13:
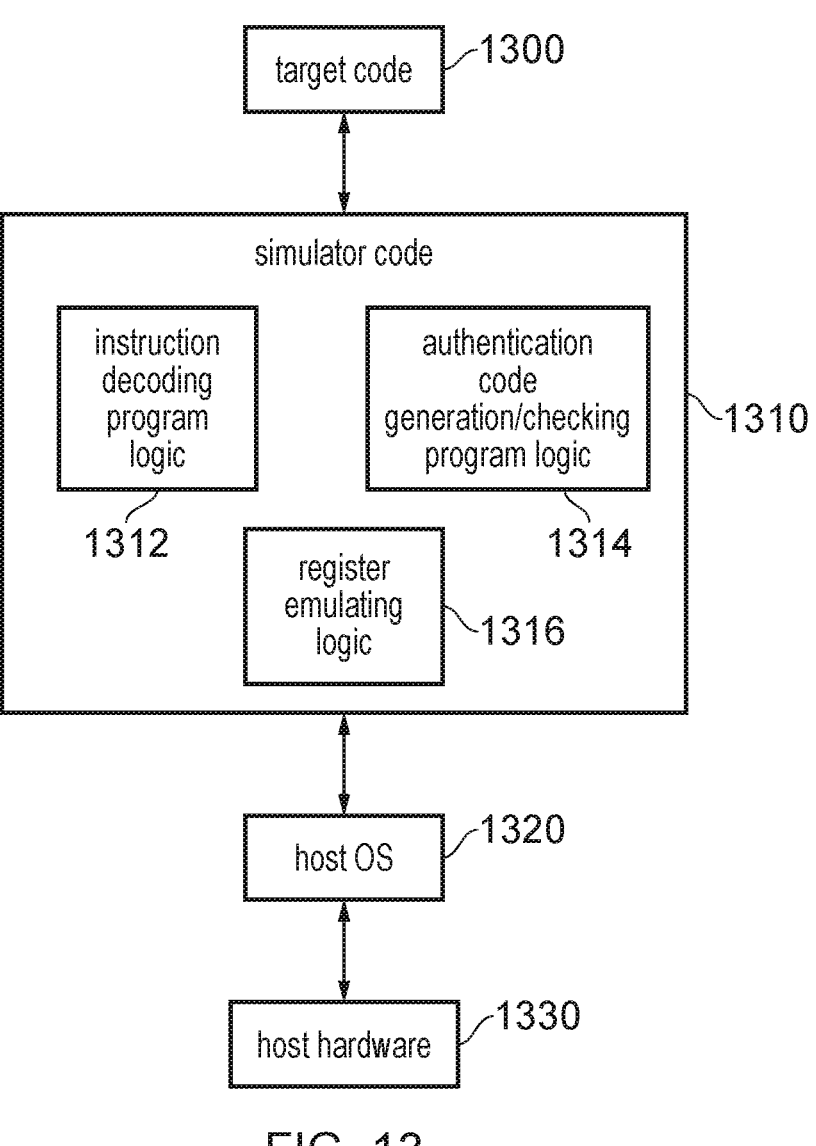

FIG. 12 schematically illustrates an example of an authentication code generation instruction; and FIG. 13 schematically illustrates an example of a simulator implementation of the present technique.

Before discussing the embodiments with reference to the accompanying figures, the following description of example embodiments and associated advantages is provided.

To improve the security of a data processing system, an authentication code can be generated based on a source value to be written to memory, and the authentication code can be compared with an expected value that is computed when contents of the memory location to which the source value was written is later read from memory. This allows the data processing system to determine whether the source value has been tampered with (e.g. overwritten) while it is stored in memory. For example, this can protect against ROP attacks when the source value used to generate the authentication code is the return address of a function call. The authentication code can be generated using a hash Function or other cryptographic Function before the source value is written to memory (for example, written to the stack), and the authentication code can also be stored to memory. Note that we have adopted the convention of writing "function" with a lower case "f" when the word "function" refers to a module of code, also known as a subroutine; and writing "Function" with a capital "F" when describing a mathematical function, as in "y=f(x)". When the source value is read back from memory security is increased if a check is made that the source value has not been modified before it is trusted to be used. This check can be performed by reading back the data from the location where the source value was stored, which we will call the "candidate value", and reading back the data from the memory location where the authentication code was stored, which we will call the "candidate code" or "candidate authentication code". If the memory locations have not been overwritten (in a ROP attack or other unexpected event), the candidate value will be the same value as the source value and the candidate code will be the same value as the authentication code. The candidate value can be used to compute an expected authentication code (or "expected code" for short) using the same Function used to compute the authentication code. The expected code can then be compared to the candidate code. If the memory locations have not been overwritten, then the expected code and the candidate code will be identical. If they are not identical then one or both of the memory locations have been overwritten, and the candidate value cannot be trusted to be used, so an error should be signalled. In order to stop an attacker computing a valid authentication code for an intentionally modified source value, the Function may be a cryptographically strong trap door Function. Secret encryption keys may also be provided as inputs to the Function, to further increase the difficulty of an attacker computing a valid authentication code. An attacker may still attempt to guess an authentication code, and for an n-bit wide authentication code, there is a 1 in $2^n$ chance of a random guess being correct. For a sufficiently large value of n this chance of a successful guess can be miniscule. For example, for a 32-bit authentication code, there is only approximately 1 in 4 billion chance of a correct guess.

The manner in which the authentication code is written to memory may be chosen depending on other aspects of the instruction set architecture. In an instruction set architecture with registers significantly wider than the required address (for example a 64-bit architecture that uses 48-bit addresses), when the source value is an address, the authentication code may be stored in the unused bits of the register holding the return address, and may be written to memory with the address using a single store operation. However, such an approach is not appropriate in an instruction set architecture with narrower registers, in which there may not be any, or not enough, unused bits in registers holding addresses; or for protecting source values other than addresses.

Another possibility, rejected by the inventor, may be to initially store the authentication code in an architectural register when it is generated by an authentication code generating instruction. The register can then optionally be written to memory with a separate store instruction to free up the architectural register for other uses. Indeed, this aligns with the typical approach in many RISC or "load-store" architectures, in which computation instructions are typically "register-to-register" instructions, which read from and write to registers and can not directly access memory. However, there are a number of potential downsides to this approach. For example, storing the authentication code to an architectural register requires one of the registers to be freed up, for example by saving the contents of a register to memory. This leads to an increase in code size which, in turn, leads to a decrease in the performance of the system. Another potential downside to this approach is that it leads to extra complexity in code generation, since the compiler will need to generate different code based on whether or not the register used to store the authentication code is also used by intervening instructions between the generation and checking of the authentication code. While complex superscalar and out-of-order microprocessor designs have mechanisms for hiding the latency of multi-cycle register-to-register computation instructions, simple in-order CPUs do not. The digital logic that implements the cryptographic Function that computes the authentication code (and the check code) is likely to require multiple clock cycles to complete that computation, especially if a small iterative design is used to implement the cryptographic Function. An iterative implementation might be chosen in order to minimize circuit size and hence manufacturing cost. Having the output of the cryptographic Function—the authentication code—written to an architectural register in the register bank makes it very difficult for a simple in-order CPU to commence execution of subsequent instructions and hide the latency of the computation of the cryptographic Function, because it will be difficult to find a time when a register file write port is free to store the cryptographic result, and it requires interlocks and forwarding paths to ensure that the output of the cryptographic block is made available correctly and with optimal timing any subsequent instruction that specifies as an input the same architectural register that will contain the authentication code. The inventor has sought to avoid these many disadvantages of following the conventional rules of a RISC or load-store architecture which require writing the results of a computation instruction to an architectural register.

Examples of the present technique provide an apparatus comprising processing circuitry to execute instructions; and decode circuitry to decode the instructions for execution by the processing circuitry. The decode circuitry is responsive to an authentication code generation instruction specifying a first source value to control the processing circuitry to generate an authentication code dependent on the first source value, and store the authentication code to a memory location associated with a store address formed using a value obtained from a register.

The authentication code generation instruction is a single instruction, so one instruction triggers both the generation of the authentication code and the saving of the authentication code to memory. Hence, the performance of the processing system can be improved, by avoiding consuming an additional architectural register for storing the authentication code, enabling reduced code size and simpler compiler generation of code by avoiding the need to provide additional load/store instructions required to free up an architectural register or vary the selection of registers used within a function (or other intervening instructions between the point of generating and checking the authentication code) depending on which register is allocated for storing the authentication code. Applying the present technique also enables the performance of the processing system to be further improved by allowing subsequent instructions to commence execution before the cryptographic portion of the authentication code generation instruction has finished producing the authentication code. This overlapping of the instruction execution can be enabled in simple in-order CPU designs by the fact that the authentication code generation instruction does not write a result to the register bank.

However, this approach of saving the authentication code directly to a memory location associated with a store address formed using a value obtained from a register is counter-intuitive, because instructions which both perform a computation (e.g. generating an authentication code) and a load or store to memory (e.g. storing the authentication code to a memory location) are not typically allowed in many instruction set architectures such as RISC (reduced instruction set computing) architectures. However, the inventor realised that the above-discussed benefits could be achieved by applying this approach, despite being counter to established practice in the field.

In some examples, the first source value comprises a value obtained from a source value register. The register may be a certain fixed register identified in the instruction set architecture (so may not need explicit encoding in the authentication code generation instruction, e.g. fixed decode circuit logic of the decoder or execution circuit logic of the processing circuitry could control reading the fixed register when the instruction is to be executed), or the source value register may be specified in a field of the encoding of the authentication code generation instruction.

In some examples, the source value register is a link register, and the processing circuitry is responsive to a function call instruction to store a function return address into the link register.

A function call instruction may be an instruction indicating that processing should branch to a particular section of code to be executed, with a function return address being stored to the link register to indicate the address of a section of code to be executed after the function is complete. The present technique is particularly beneficial when applied to a function return address, since the generation of an authentication code for a function return address can guard against attacks such as ROP attacks. It will be appreciated, however, that the present technique may also help to guard against other types of security exploit.

In some examples, the decode circuitry is responsive to the authentication code generation instruction to generate an authentication code generation micro-operation to control the processing circuitry to generate the authentication code, and an authentication code storing micro-operation to control the processing circuitry to store the authentication code to the memory location associated with the store address. In some implementations a micro-operation may correspond to a well-defined micro-instruction; in other implementations a micro-operation may correspond to a set of control signals and/or busses signalling the required operation to the execution apparatus.

This can be useful because typical processing pipeline micro-architectures may often have separate execution units for load/store operations and computation (register-to-register) operations, given that load/store instruction set architectures typically separate the load/store functionality and the computation functionality into separate instructions. Therefore, it can be beneficial for the decode circuity to split the authentication code generation instruction into an authentication code generation micro-operation, which may make use of a computation unit which performs the authentication code generation computation based on a source value in a register, and an authentication code storing micro-operation, which may make use of a load/store unit. This allows the authentication code generation instruction to be compatible with typical processing pipelines.

In some examples it may be beneficial to issue the authentication code generation micro-operation and the authentication code storing micro-operation in parallel, to achieve a lower execution latency for the authentication code generation instruction, e.g. to reduce the delay before the next subsequent instruction can commence execution. Executing the micro-operations in parallel allows the authentication code generation instruction to have the same cycle timing as a normal store operation for the address generation and exception checking portions of the instruction's execution, even if the generation of the data to store to memory (which is the authentication code) might be delayed due to it being generated by a multi-cycle cryptographic function. Exception checks would typically include access permission checks in a memory protection unit (MPU); or, if the CPU implements virtual memory and/or virtualization support, in a memory management unit (MMU).

In some examples, the processing circuitry is configured to inhibit taking of an exception between execution of the authentication code generation micro-operation and execution of the authentication code storing micro-operation.

If an exception (e.g. a suspending of current processing and switching to a different task—in some examples this may be an interrupt) is taken between the two micro-operations, this would prevent the authentication code from being stored, which may lead to the authentication code being lost (as there is no architectural register storing the authentication code which could be saved to memory on taking the exception). On taking an exception, an exception return address may be recorded to indicate the address of the instruction to which processing should return on completing the exception handling. Hence, if an exception was taken between the two micro-operations of the authentication code generation instruction, the exception return address would identify the address of the authentication code generation instruction, making it difficult to control the processing circuitry to perform only the authentication code storing micro-operation upon returning from the exception. As no architectural register is used to store the authentication code before it is saved to memory in response to the single authentication code generation instruction, it cannot be guaranteed that the authentication code would still be available after the exception return (unlike other architectural registers which may be saved to memory on taking the exception to preserve them). Therefore, if the exception was taken between the two micro-operations, on returning from the exception the authentication code generation micro-operation may need to be re-executed, which adversely impacts on the performance of the system, since the generation of an authentication code may be slow in comparison to other arithmetic operations. Therefore, by preventing the taking of an exception between the two micro-operations, the performance of the apparatus can be improved by avoiding re-executing the slow authentication code generation operation on returning from the exception.

In some examples, the processing circuitry comprises authentication code generation circuitry to generate the authentication code in response to the authentication code generation micro-operation, the authentication code generation circuitry comprising state retaining circuitry to maintain state information allowing the retention of the authentication code for at least one cycle after a cycle in which the authentication code was generated. The processing circuitry of these examples is responsive to the authentication code storing micro-operation to retrieve the authentication code from the state retaining circuitry of the authentication code generation unit, prior to storing the authentication code to the memory location associated with the store address.

It may not be feasible to immediately store the authentication code to the memory location associated with the store address once it has been generated—the authentication code may need to be temporarily held between execution of the authentication code generation micro-operation and the authentication code storing micro-operation. Hence, in some examples, the processing circuitry is configured to store the authentication code in a temporary storage location, or hold the outputs of the circuit that computes the cryptographic Function steady, prior to storing the authentication code to the memory location associated with the store address. There are a number of ways of implementing the temporary storage location or the holding.

In one example, the outputs of the flip flops that drive the inputs to the final stage of combinatorial logic that computes the cryptographic Function that generates the authentication code may be held unchanged for a plurality of clock cycles, by conventional means, so that the authentication code output of the combinatorial logic is held unchanged without the addition of extra storage. Such flip flops which can hold this internal state of the logic implementing the cryptographic Function for a plurality of clock cycles is one form of "state retaining circuitry". The authentication code storing micro-operation could then read the value to be stored to memory from the output of the authentication code generation circuitry. This approach is particularly applicable for the authentication code generation instruction because it is expected that the logic that computes the cryptographic Function will only be used once at the start and once near the next of each called function so performance does not need to be optimised for back-to-back cryptographic instructions. The inventor recognised that, even in an alternative implementation where an authentication code generating instruction does write the authentication code to an architectural destination register (unlike the approach described above), in practice the register file may be a distance away from the authentication code generating circuitry on an integrated circuit, so the authentication code generating circuitry may have some pipeline flip flops at its output which capture the generated authentication code before it is transferred to the destination register. Such flip flops are another form of "state retaining circuitry". Hence, in an implementation which uses a single instruction to both generate and save the authentication code, there is no need for an architectural register to be updated with the authentication code, as the store micro-operation can read the authentication code from the state retaining circuitry of the authentication code generation circuitry. Hence, this avoids any need for any additional storage elements which would not already be required in the authentication code generation circuitry itself.

In some examples, the temporary storage location comprises one of an architecturally invisible register, and a buffer.

An architecturally invisible register (e.g. a dedicated microarchitectural register not visible to the instruction set architecture) or a buffer can be particularly efficient techniques for implementing the temporary storage location. The buffer may be an existing buffer in the apparatus, such as an existing write buffer. On the other hand, the buffer may instead be a dedicated buffer for holding authentication codes.

In some examples, the temporary storage structure comprises a buffer comprising at least one entry comprising at least an address field, an address valid field, and a data value valid field. In such examples, the processing circuitry is configured to write the store address into the address field, and set the address valid field to indicate that the address field is valid, prior to completing generation of the authentication code, and update the data value valid field to indicate that a data value corresponding to the store address is valid when the authentication code has been generated. In these examples, the processing circuitry is also configured to begin execution of one or more subsequent instructions prior to completion of generation of the authentication code, and when the one or more subsequent instructions includes a subsequent load/store instruction, the processing circuitry is configured to compare a target address identified by the subsequent load/store instruction with the store address stored in the address field, and when the target address matches the store address, and the address field is indicated as valid, to control handling of the subsequent load/store instruction depending on whether the data value valid field indicates that the data value corresponding to the store address is valid.

The generation of an authentication code may be a slow (e.g. multiple cycle) process, so the performance of the system can be improved by allowing the processing circuitry to begin execution of subsequent instructions prior to completion of generation of the authentication code. However, allowing execution of a subsequent instruction to start may carry the risk of a subsequent instruction attempting to access the memory location where the authentication code will be written before the authentication has been generated. For example, the subsequent instruction may be a load instruction attempting to read the authentication code, or a store instruction targeting the same location. Therefore, in some examples of the present technique, a buffer is provided to record the store address of the memory location at which the authentication code will be stored, an address valid field to indicate that the store address has been written and that the process of storing to memory is not yet complete, and a data valid field indicating whether an authentication code has been generated. The processing circuitry can then control handling of any subsequent load or store instructions in dependence on the values recorded in the buffer. This can allow the processing circuitry to ensure that accesses to the memory location at which the authentication code will be stored will be performed in an appropriate order. Exactly how this is achieved will depend on the specific implementation of the present technique. However, in some examples, the processing circuitry may stall subsequent accesses to that memory location until the authentication code has been stored in the buffer. In some examples, where the subsequent instruction is a load instruction to load a data value from that memory location, the processing circuitry may be arranged to retrieve the authentication code directly from the buffer (once it has been generated) and return that as the result of the load. However, it will be appreciated that these are just examples of how the processing circuitry may control handling of a subsequent load/store operation, and other examples are also possible.

As discussed above, for the authentication code generation instruction, the store address is formed using a value obtained from a register. This register could be a certain fixed register identified in the instruction set architecture, or may be specified in a field of the encoding of the authentication code generation instruction.

However, in one example the register used to provide the value for forming the store address comprises a stack pointer register. Hence, the authentication code is stored to a memory location associated with a store address formed using a value obtained from the stack pointer register. Some instruction set architectures define a dedicated register as a stack pointer register, with the expectation that code may use the address in the stack pointer register to handle saving of information to a stack (a last in first out (LIFO) data structure). For example, writing architectural register state to a stack prior to a function call can be useful to preserve the architectural register state for use after execution returns from the called function. This may be particularly useful for nested function calls, where it might be useful to store a series of sets of state to a stack, so that the LIFO stack structure means that on returning from the function calls the state can be read off the stack in the opposite order from which it was allocated to the stack (e.g. corresponding with the order of the nested functions). As the authentication code can be used to verify integrity of some of the saved state saved to the stack (e.g. a function return address), and in the case of nested functions there will be one authentication code for each return address, it may be useful to save the authentication code to the stack as well. Hence, it can be useful to provide a form of the instruction for which the register used to form the store address is the stack pointer register.

In some examples the processing circuitry is configured to store the authentication code to the store address without modifying the stack pointer. With careful selection of the instruction encoding for the new authentication code generation instruction to be an encoding that is a no-operations (no-op) in legacy systems, the legacy systems can still execute new program binaries that contain the authentication code generating instruction. By "legacy systems" we mean apparatuses designed and manufactured to be capable of executing an older version of the instruction set architecture which did not include the authentication code generating instruction. One might expect that when the authentication code is pushed to the stack, the stack pointer should be updated to reflect that the stack is now deeper. However, that would make it difficult or impractical to generate one program binary that would execute efficiently on both new and on legacy systems, as new systems would adjust the stack pointer when the authentication code was written to the stack, while legacy systems (which would interpret the instruction as a no-op) would not adjust the stack pointer. This would cause problems for subsequent code that accesses function parameters, local variables, or other items on the stack, as the required offset from the stack pointer to the item on the stack would be different when running on a new system to that required when running on a legacy system. If this legacy system compatibility is desired, it is better for the compiler to allocate a storage location to hold the authentication code within the stack frame for each function, in the same way that locations are often allocated for function local variables, allowing the authentication code to be stored without modifying the stack pointer.

In some examples, the store address is formed by adding an offset amount to the stack pointer.

Hence, it is not essential for the store address to be stored at the location at the top of the stack. For example, the offset amount may be programmable (e.g. identified in a field of the authentication code generation instruction), or it may be a fixed offset defined in the instruction set architecture and implemented in hardware. The offset amount may be any amount, but in some examples the offset may be zero. If a programming convention can be enforced so that compilers, assembly language programmers, JITs, etc. who generate code always allocate the authentication code on the stack at the same distance from the stack pointer, then the offset can be fixed amount, minimizing the required instruction encoding space required for the authentication code generation instruction.

In some examples, the processing circuitry comprises an in-order processor, adapted to begin execution of each of the instructions in a program order.

In an in-order processor, instructions are issued in a program order (although it is noted that the execution of a subsequent instruction may be permitted to start before execution of an earlier instruction completes), meaning that a delay in executing one instruction can severely impact on the performance of subsequent instructions, thus decreasing the performance of the system as a whole. The generation of an authentication code can take a relatively long time, so the performance of the system may be adversely affected if the processor has to wait for the authentication code generation instruction to complete before executing a subsequent instruction. Therefore, the performance gains associated with avoiding the additional load/store overhead required to free up an architectural register, achievable by implementing the present technique, can be particularly advantageous in an in-order processor. Moreover, it may be counter-intuitive to provide an authentication code generation instruction combining the code generation and storage in a single instruction in an in-order processor, since there is no register renaming circuitry which could easily provide a temporary register for storing the generated authentication code before it is stored to the memory location associated with the store address. However, the inventor realised that there are options which could be used to implement the instruction on an in-order processor which surprisingly are feasible:

although there is generally a great prejudice against providing additional special-purpose micro-architectural registers given the general desire that in-order processors should be of low cost in terms of circuit area and power, providing an extra micro-architectural register to store the authentication code is nevertheless feasible as it does not add significant cost in terms of circuit area, and the benefits of improved performance achievable from the present technique may therefore outweigh the minor increase in circuit cost.

alternative solutions avoiding the use of an extra micro-architectural register are also possible, such as using existing state retaining circuitry in the authentication code generation circuitry, or a store buffer which may already (at least partially) be provided for hazarding, forwarding or merging purposes.

Thus, the inventor realised that implementing the authentication code generation instruction in an in-order processor is feasible, and that the increase in circuit cost would be minimal and is justifiable given the easing of register pressure discussed above.

In some examples, the processing circuitry comprises an out-of-order processor adapted to support execution of the instructions in a different order to a program order.

Although the present technique is particularly advantageous in in-order processors, it can also be implemented in an out-of-order processor, where the advantages of improved performance by avoiding the need to write the authentication code to an architectural register can still be achieved.

In some examples, the processing circuitry is configured to store the authentication code in a temporary register allocated by register renaming circuitry, prior to storing the authentication code to the memory location associated with the store address, the temporary register comprising a register not currently mapped to an architectural register.

In an out-of-order processor supporting register renaming, one of the physical registers not currently mapped to an architectural register could be used to temporarily store the authentication code between the authentication code generation micro-operation and the authentication code storing micro-operation. This may mean that no additional hardware structure would be needed, since the number of physical registers in an out-of-order processor is typically larger than the number of architectural registers and so includes some spare unmapped registers which can store the authentication code.

In some examples, the authentication code generation instruction also specifies a modifier value to further strengthen the system against attacks, and the processing circuitry is configured to generate the authentication code using a cryptographic Function, dependent on the first source value and the modifier value. If the modifier value is chosen to be the stack pointer, then recursive calls to the same function will each generate a different authentication code. In some particular examples, the cryptographic Function is computed in an iterative process performed over multiple cycles.

Various cryptographic functions may be used to generate the authentication code. For example, a cryptographic function such as a secure hash algorithm (SHA) or a message-digest (MD) algorithm may be used. The cryptographic function used may be based on a block cipher, for example the QARMA block cipher may be used. See "The QARMA Block Cipher Family", Roberto Avanzi, *IACR Transactions on Symmetric Cryptology*, 2017(1), 4-44.

In some examples, the decode circuitry is responsive to an authentication code checking instruction specifying a second source value to control the processing circuitry to read a data value from a second memory location associated with a load address formed using a value obtained from a register, generate an expected authentication code dependent on the second source value, compare the data value with the expected authentication code, and trigger an error handling response when a mismatch is detected between the data value and the expected authentication code. The authentication code checking instruction is a single instruction.

In this way, the processing circuitry can check whether the second source value or the data value read from the memory location associated with the load address has been altered (e.g. overwritten), indicating that an attacker may have accessed the contents of the associated memory location. The processing circuitry may then trigger an error handling response accordingly. If the second source value is a candidate return address held in a register, that may have been retrieved from the stack using an earlier memory access instruction, and the data value is a candidate authentication code, then this check allows the apparatus to guard against an attacker attempting to cause unauthorised sections of code to be executed (e.g. a ROP attack) or to cause incorrect code functioning by tampering with a data value stored in memory, thus improving the security of the system. It will be appreciated that the exact form of the error handling procedure will depend on the specific implementation.

In some examples, the apparatus is configured to operate according to a load/store architecture.

A load/store architecture may be an architecture in which instructions which both perform a computation (e.g. generating an authentication code) and perform a load or store (e.g. storing the authentication code to a memory location) are not typically allowed. In at least some examples, a load/store architecture is an instruction set architecture in which memory access instructions are separated from arithmetic instructions. For example, arithmetic operations such as like add, subtract and multiply instructions may be register-to-register instructions (e.g. the source and result values are read from or written to registers, rather than from memory), and the only instructions expected to read or write to memory are load and store instructions and certain special purpose memory operations such as swap operations or other synchronisation instructions such as load-locked and store conditional instructions. It will be appreciated that there may be some exceptions to this definition—for example, the memory access instructions may do some simple address calculation operations, such as calculating an offset by shifting or sign extending/zero extending a field from a register or an instruction bit pattern, and may do some additions or subtractions. Another exception may be "far atomics", where the processor sends a message to a memory system component instructing it to perform an arithmetic operation locally such as "add 1 to the value stored at location X", to avoid the delay involved in loading the value into the CPU and then writing it back to memory. However, as a general rule, instructions in a load/store architecture may be separated into instructions which perform computations and instructions which perform memory accesses.

In such architectures, the present technique is counter-intuitive, because it goes against this established principle by providing an instruction which both performs computations (e.g. generating an authentication code, or generating an expected authentication code) and a load or a store (e.g. storing the authentication code, or loading a data value for checking against the expected authentication code). However, the inventor realised that the benefits discussed above of improved performance due to not storing the authentication code in an architectural register can be achieved by implementing the present technique, despite having a single instruction combining both a computation of the value to be stored and the storing of that value to memory being counter to established practice in the art.

In some examples, the processing circuitry is configured to record a program counter value associated with each of the at least one authentication code checking instruction for the duration of the execution of the authentication code checking instruction, and to make the recorded program counter value available to software or accessible via a debug interface after the triggering of the error handling response.

In this way, in the case of an error handling response being triggered, the point at which the error arose (e.g. the specific instance of the authentication code checking instruction in the program) can be easily identified. Since the generation of the expected check code using a cryptographic function during the execution of the authentication code checking instruction is typically a multi-cycle operation, recording the program counter can be particularly useful in situations where the CPU design allows execution of subsequent instructions to begin before execution of the authentication code checking instruction has completed. In such situations, by the time a mismatch between the data value and the expected authentication code has been detected and the appropriate error handling response has been triggered, the processing circuitry may have executed a number of subsequent instructions, making it difficult to attribute the cause of the error to the specific instance of the authentication code checking instruction in the program. Therefore, recording the program counter value associated with the authentication code checking instruction for the duration of the authentication code checking instruction's execution makes debugging of a program during software development easier.

The techniques discussed above can be implemented in a hardware apparatus which has circuit hardware implementing the processing circuitry and decode circuitry described above, which support the authentication code generation instruction and authentication code checking instruction as part of the native instructions set architecture supported by the decode circuitry and processing circuitry.

However, in another example the same techniques may be implemented in a computer program (e.g. an architecture simulator or model) which may be provided for controlling a host data processing apparatus to provide an instruction execution environment for execution of instructions from target code. The computer program may include instruction decoding program logic for decoding instructions of the target code so as to control a host data processing apparatus to perform data processing. Hence, the instruction decoding program logic emulates the functionality of the instruction decoder of a hardware apparatus as discussed above. Also, the program may include register maintenance program logic which maintains a data structure (within the memory or architectural registers of the host apparatus) which represents (emulates) the architectural registers of the instruction set architecture being simulated by the program. The emulated registers may include any of the registers described above, including the registers used to provide the source value and the value for forming the store/load address, for example. The instruction decoding program logic includes support for the authentication code generating instruction and/or the authentication code checking instruction which have the same functionality as described above for the hardware example. Hence, such a simulator computer program may present, to target code executing on the simulator computer program, a similar instruction execution environment to that which would be provided by an actual hardware apparatus capable of directly executing the target instruction set, even though there may not be any actual hardware providing these features in the host computer which is executing the simulator program. This can be useful for executing code written for one instruction set architecture on a host platform which does not actually support that architecture. Also the simulator can be useful during development of software for a new version of an instruction set architecture while software development is being performed in parallel with development of hardware devices supporting the new architecture. This can allow software to be developed and tested on the simulator so that software development can start before the hardware devices supporting the new architecture are available.

Particular embodiments will now be described with reference to the figures.

Figure 1:
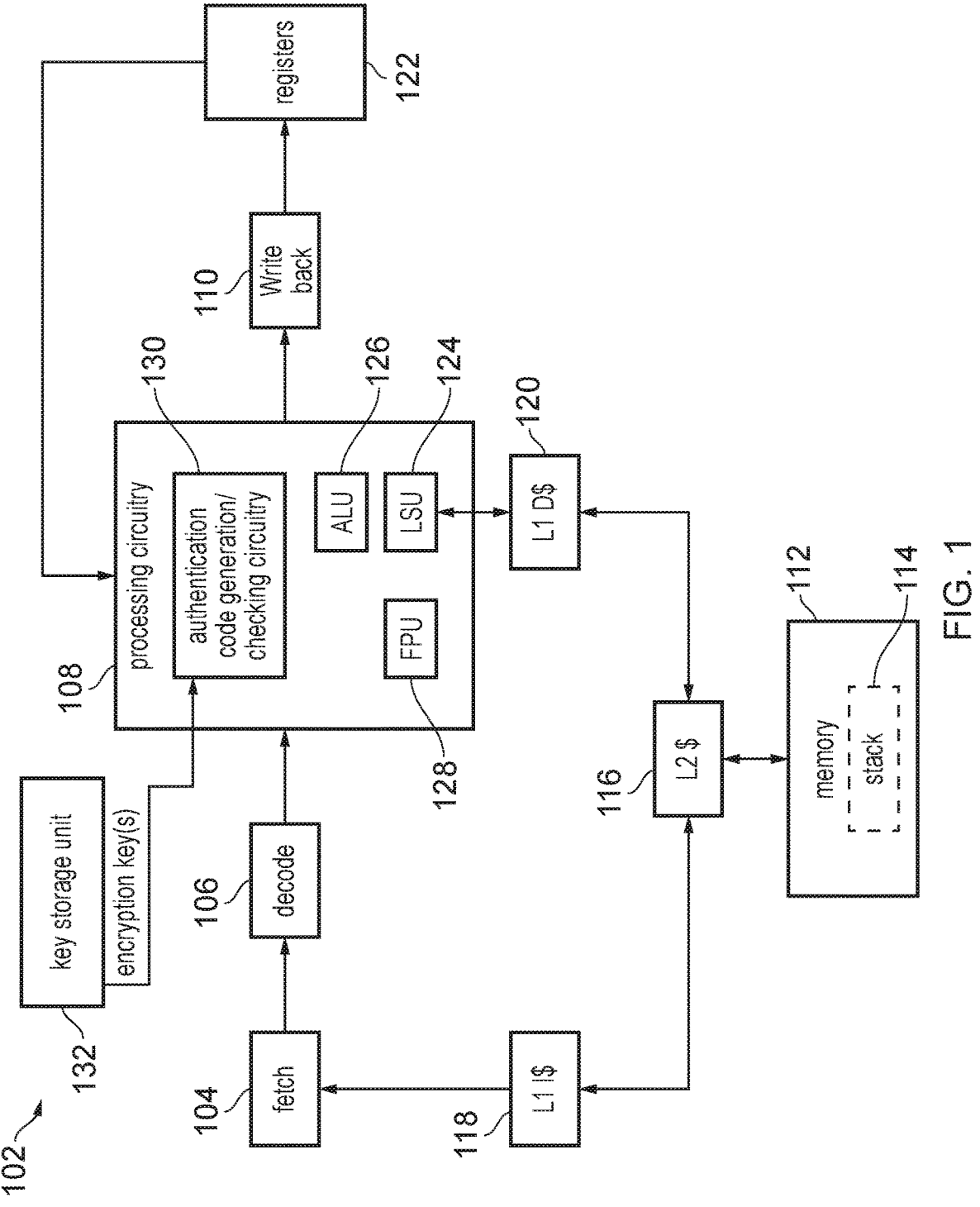

FIG. 1 shows an example of a data processing system 102 in which the present technique may be implemented. In particular, the data processing system 102 of FIG. 1 is an in-order processor, meaning that it is designed to execute instructions in a program order. The data processing system 102 has a processor pipeline comprising a number of stages—a fetch stage 104, a decode stage 106, processing circuitry 108 (also referred to as an execute stage) and a writeback stage 110. The data processing system 102 also includes registers 122, a key storage unit 132 that holds encryption keys, and a memory system, which comprises a memory 112, a shared level two cache 116 and two level one caches 118, 120. One of the level one caches 118 is for storing instructions and the other level one cache 120 is for storing data, while the level two cache 116 stores both data and instructions. When data or instructions are accessed in the memory system, the appropriate level one cache 118, 120 is first accessed to determine whether the relevant data or instructions is present at that level. If the data instructions are not present in the level one cache 118, 120, the level two cache 116 is checked, and if the data or instructions are not present in any of the caches, then they are retrieved from memory 112. It will be appreciated that the data processing system 102 may have more cache levels than are shown in FIG. 1, and that the particular micro-architecture of the processing pipeline and memory system is just one particular example, which could vary considerably from what is shown in FIG. 1.

The fetch stage (fetch circuitry) 104 fetches instructions from the level one instruction cache 118, and passes them to the decode stage (decode circuitry) 106. The decode circuitry 106 decodes the instructions to generate control signals which cause the processing circuitry 108 to execute the instructions, loading any required operands from the registers 122. For example, the processing circuitry 108 comprises a load/store unit (LSU) 124 for executing load and store instructions, by accessing the level one data cache 120 or other levels of the cache hierarchy or memory system, an arithmetic logic unit (ALU) 126 for executing integer arithmetic instructions, and a floating point unit (FPU) 128 for executing floating point instructions. Once the instructions have been executed, the writeback stage 110 writes the results of the instructions back to the registers 112.

The processing circuitry 108 also includes authentication code generation/checking circuitry 130, configured to generate and check authentication codes, using encryptions keys from key storage unit 132. An authentication code may be generated for an address (such as a function return address) that is to be written to a stack data structure 114 maintained in memory 112. In order to guard against security exploits such as ROP attacks, when data is read from the stack location that the return address was written to, it is not trusted to be the return address, and is treated as a candidate value until it has been validated. As described above, the validation is performed by generating an expected check code from the candidate value, and comparing the expected check code to the authentication code to determine whether they are identical. It should be noted that the stack 114 is not a physical structure in the data processing apparatus 102, but is data stored in the memory 112 which is allocated into the memory at runtime, so it is not present when the hardware is powered down or the when system is first booted.

The authentication code generating/checking circuitry 130 is configured to generate an authentication code in response to an authentication code generation instruction specifying a first source value (e.g. the address to be written to the stack 114) and encryption keys from key storage unit 132. The authentication code generation instruction is fetched from the level one instruction cache 118 by the fetch circuitry 104, and decoded by the decode circuitry 106. The decode circuitry 106 decodes the authentication code generation instruction to control the processing circuitry 108 to generate an authentication code. More particularly, the decode circuitry 106 generates an authentication code generation micro-operation and an authentication code storing micro-operation. The processing circuitry 108 is responsive to the authentication code generation micro-operation to read the first source value from a register in the register bank 122 (for example, from the link register), and to provide the first source value to the authentication code generating/checking circuitry 130, which generates an authentication code based on the first source value, and based on at least one encryption key from key storage unit 132. The processing circuitry 108 is also responsive to the authentication code storing micro-operation to store the authentication code in the stack 114.

In response to the authentication code generation micro-operation, the authentication code generation/checking circuitry 130 may apply an authentication code generating Function to the first source value based on a cryptographic key from key storage unit 132 and at least one modifier value, which might be the stack pointer register value from registers 122. The authentication code generating Function may use a cryptographic function which makes it computationally infeasible to guess the authentication code associated with a particular address without knowledge of the function used and the cryptographic key. The authentication code generating Function may be computed using an iterative hardware implementation executed over a relatively large number of multiple clock cycles in comparison to other arithmetic instructions.

Similarly, the authentication code generating/checking circuitry 130 is responsive to an authentication code checking instruction specifying a second source value (e.g. a candidate function return address which may have been retrieved from the stack into a register and needs to be verified before use), to read a candidate code from the stack 114 (e.g. from a location where an authentication code is expected to be stored), to generate an expected authentication code based on the second source value using a cryptographic Function, and to compare the expected authentication code with the candidate code. This allows the authentication code generating/checking circuitry 130 to determine whether a value (e.g. a function return address) written to the stack 114 and later read back from the stack has been overwritten between the write and the later read, thus guarding against security exploits such as ROP attacks. If the data value and expected authentication code match, this indicates a high probability that the function return address (for example) has not been overwritten, and processing continues. On the other hand, if there is a mismatch between the source value and expected authentication code, this indicates that the function return address, or the authentication code, or both, have been overwritten, and the processing circuitry 108 thus triggers an appropriate error handling response.

In one example use case, the second source value is expected to be a pointer address which has previously been authenticated by generating and storing a corresponding authentication code as discussed above, but if an attacker has modified the pointer the authentication code may not be valid. In response to the authentication code checking instruction, the decode circuitry 106 controls the processing circuitry 108 (specifically the authentication code generation/checking circuitry 130) to apply the same authentication code generating Function to the address bits of the second source value, using corresponding cryptographic key and modifier values to the ones used when the authentication code was generated. The candidate code is loaded from the location on the stack 114 where the authentication code was stored. The expected authentication code is then compared with the candidate code, and it is determined whether the expected authentication code and the candidate code match.

By using the authentication code generation and checking instructions described above, this allows a function return address to be authenticated so that is more difficult for an attacker to inject an unauthorised return address and successfully cause code to branch to a location identified by that address. Use of a cryptographic Function as the authentication code generation Function, together with secret encryption keys, can make it difficult for an attacker to compute of the authentication code associated with a particular address that the attacker would like to use. The authentication code generation instruction can be included in the code at the point shortly after a return address is generated, and the authentication code checking instruction can be included later when the return address is actually to be used, to validate the authentication code before actually branching to the address.

While the data processing apparatus 102 of FIG. 1 is arranged to execute most instructions in the program order (e.g. the order in which they are fetched from the level one instruction cache 118), it should be noted that the computation of the authentication code (generated in response to an authentication code generation instruction) or the expected authentication code (generated in response to the authentication code checking instruction) may be continue to completion in parallel with the execution of subsequent instructions.

Although the authentication code generating/checking circuitry 130 is shown as a single block in FIG. 1, it should be noted that there may be separate circuitry for generating and checking authentication codes.

Figure 2:
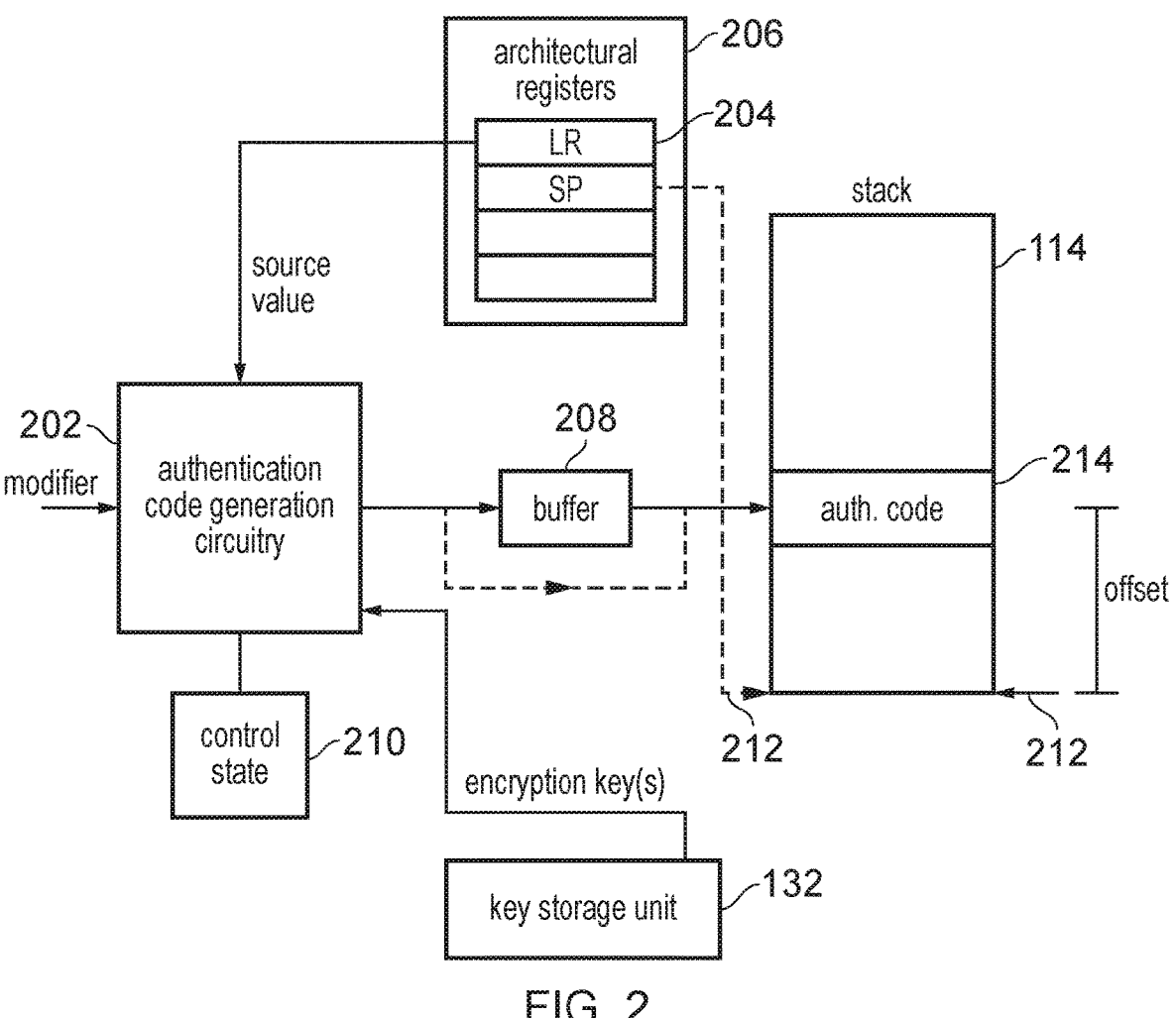

FIG. 2 shows an example of an apparatus for generating an authentication code. A set of architectural registers 206 are shown including a link register 204, which may be used to store a function return address for a function currently being executed by the processing circuitry (not shown). However, functions are often nested (e.g. a new function is called from within an earlier function), which may mean that the link register 204 needs to be freed up to store the function return address of an inner function. Therefore, if a nested function is called, the contents of the link register may be written to the stack 114. However, as discussed above, this may leave the apparatus vulnerable to ROP attacks, in which the function return address is overwritten by an attacker, in an attempt to cause the processing circuitry to execute unauthorised sections of code.

To guard against attacks such as these, an authentication code can be generated based on the function return address, which can later be compared with an expected value of the authentication code to determine whether the function return address has been overwritten. Therefore, authentication code generation circuitry 202 is provided, which takes as inputs a source value (e.g. a function return address) read from a link register 204 (one of a set of architectural registers 206), and (optionally) at least one modifier value, and (optionally) one or more encryption keys from key storage unit 132. The authentication code generation circuitry 202 is responsive to an authentication code generation micro-operation (generated by decode circuitry in response to an authentication code generation instruction) to generate the authentication code based on the source value and the modifier value. As discussed above, the authentication code may be generated by the authentication code generation circuitry 202 using a cryptographic Function, taking one or multiple cycles to complete. The authentication code generation circuitry 202 is then responsive to an authentication code storing micro-operation (also generated by the decode circuitry in response to the authentication code generation instruction) to store the authentication code to an authentication code storage location 214 in the stack 114. In this example, the authentication code is first stored in a buffer 208, before being stored in the stack 114. It should be noted, however, that the buffer is a micro-architectural feature, and is invisible to the architecture. Therefore, from the perspective of the architecture (which is generally the programmer's view), the authentication code is stored directly to the stack 114 (as shown by the dotted line).

As discussed above, generating the authentication code and storing it to the stack 114 in response to a single instruction avoids the need for the code to be temporarily stored to an architectural register before it is stored to the stack. This improves the performance of the system overall by avoiding the additional instructions required to free up an architectural register, and also reduces the complexity of code generation. It also simplifies pipeline interlocks which stall processing when an instruction needs an input operand which is not yet available. It also avoids the need for the authentication code generation circuit to be able to write to the architectural registers 206. This approach is counter-intuitive, since in a typical load/store architecture most instructions are expected to either perform computations or load or store data in memory—instructions which both perform computations and write to memory (such as the authentication code generation instruction) are rare. However, the inventor realised that going against the established practice in the field to provide an instruction that both generates an authentication code and writes it to the stack 114 can provide the benefits of improved performance discussed above.

The authentication code may be stored in the stack 114 without modifying the stack pointer 212, at a position that is offset from the pointer 212 by an offset amount. The offset amount may be programmable, appearing in a field of the authentication code generation instruction, or it may be fixed in the hardware, identified by fixed decode logic. Storing the authentication code in this way, rather than storing it using a PUSH which modifies the stack pointer 212, allows software which includes the authentication code generation instruction to run on legacy systems which do not support the authentication code generation instruction, as discussed in detail earlier in this patent specification.

Between execution of the authentication code generation micro-operation and the authentication code storing micro-operation by the authentication code generation circuitry 202, it is beneficial to inhibit the taking of exceptions. To achieve this, some control state information 210 (which may be a single bit) is stored, which indicates that any exceptions raised between the two micro-operations should be inhibited, at least until the authentication code storing micro-operation has been executed. This is consistent with the approach of treating the generation and storing of the authentication code as a response to a single instruction, and avoids the authentication code being lost due to an exception being taken midway through execution of the instruction.

Figure 3:
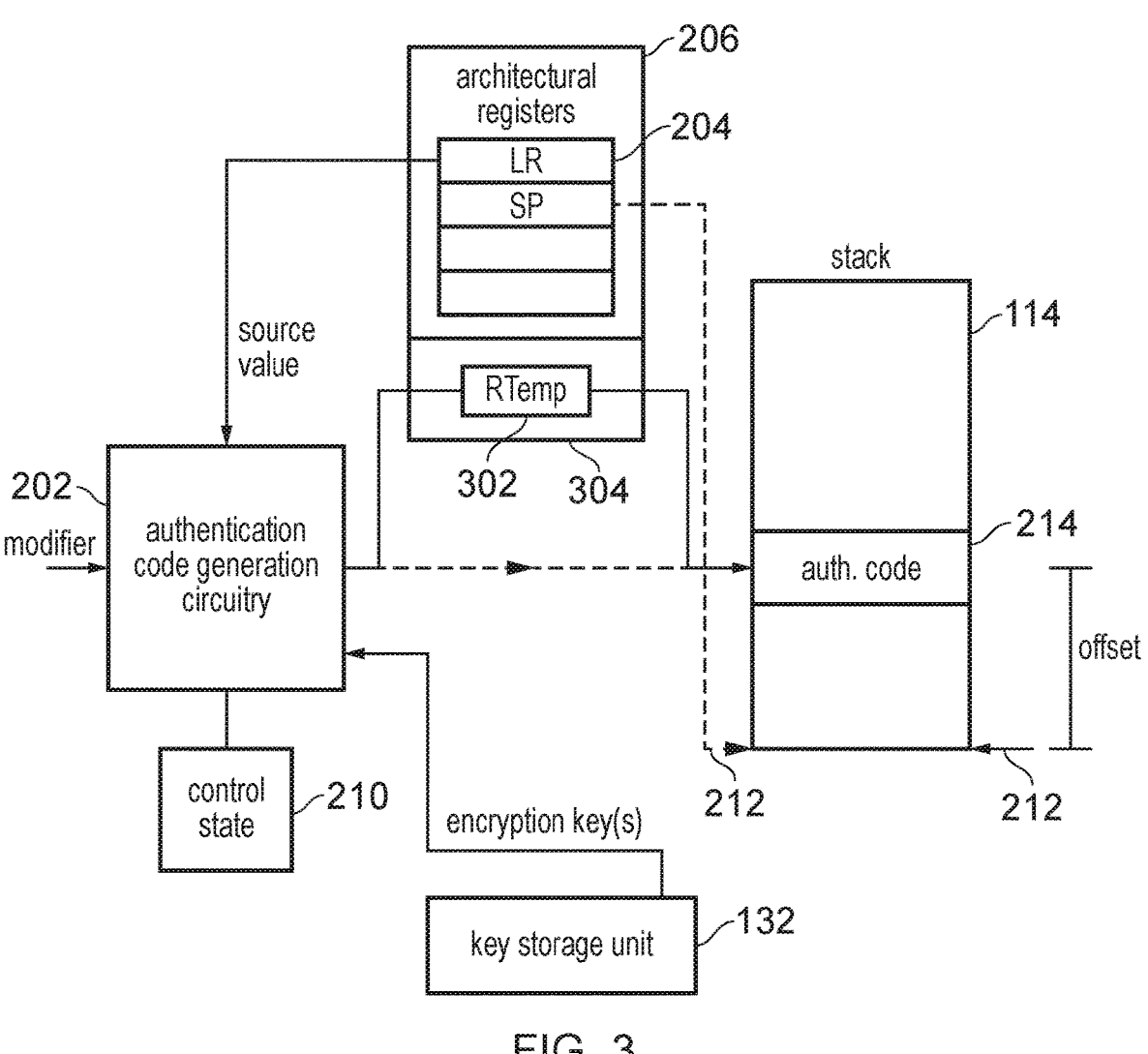

FIG. 3 shows another example of an apparatus for generating an authentication code. In this example, the authentication code is generated by the authentication code generation circuitry 202 in the same way as in the example of FIG. 2 (in response to the authentication code generation micro-operation). However, in this example the authentication code generation circuitry 202 is responsive to the authentication code storing micro-operation to store the authentication code to the stack 114 via a temporary register (RTemp) 302 provided in a set of microarchitectural registers 304 that are architecturally invisible. The temporary register 302 may, for example, be a microarchitectural register identified by register renaming circuitry (not shown). In this way, from the perspective of the architecture, the authentication code is stored directly to the stack 114 (shown by the dotted line). Therefore, the advantages discussed above of generating and storing the authentication code in response to a single authentication code generation instruction are provided.

Figure 4A:
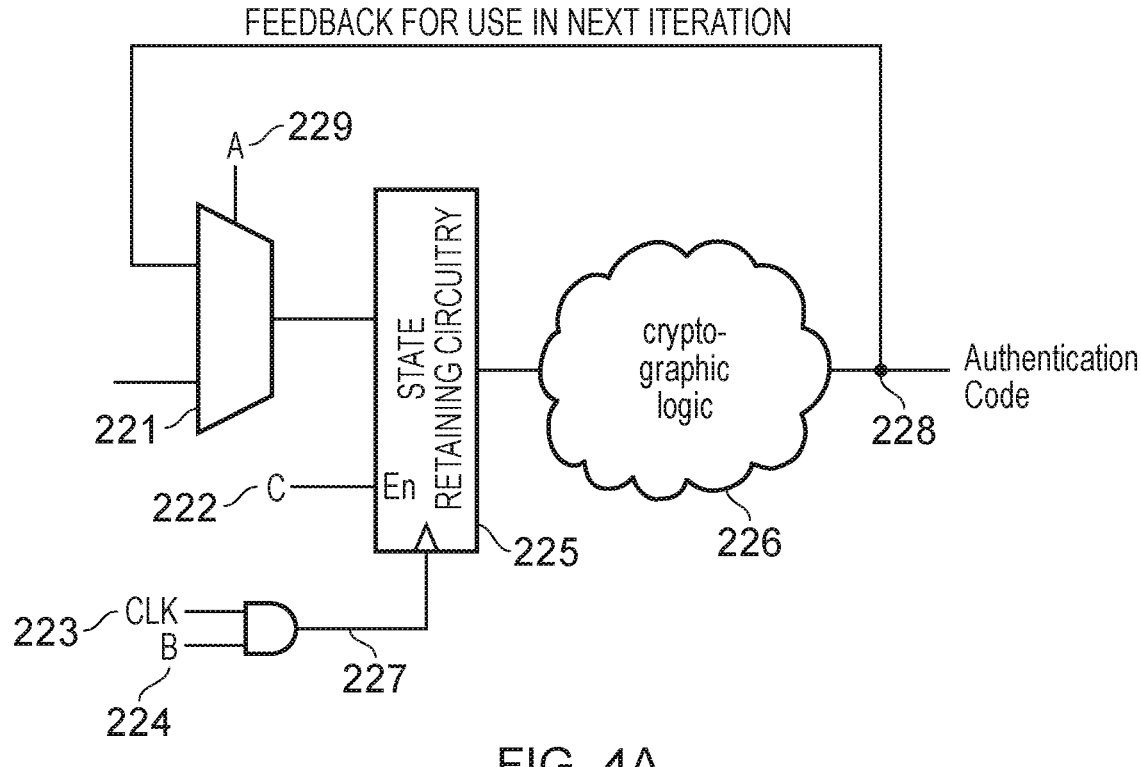
Figure 4B:
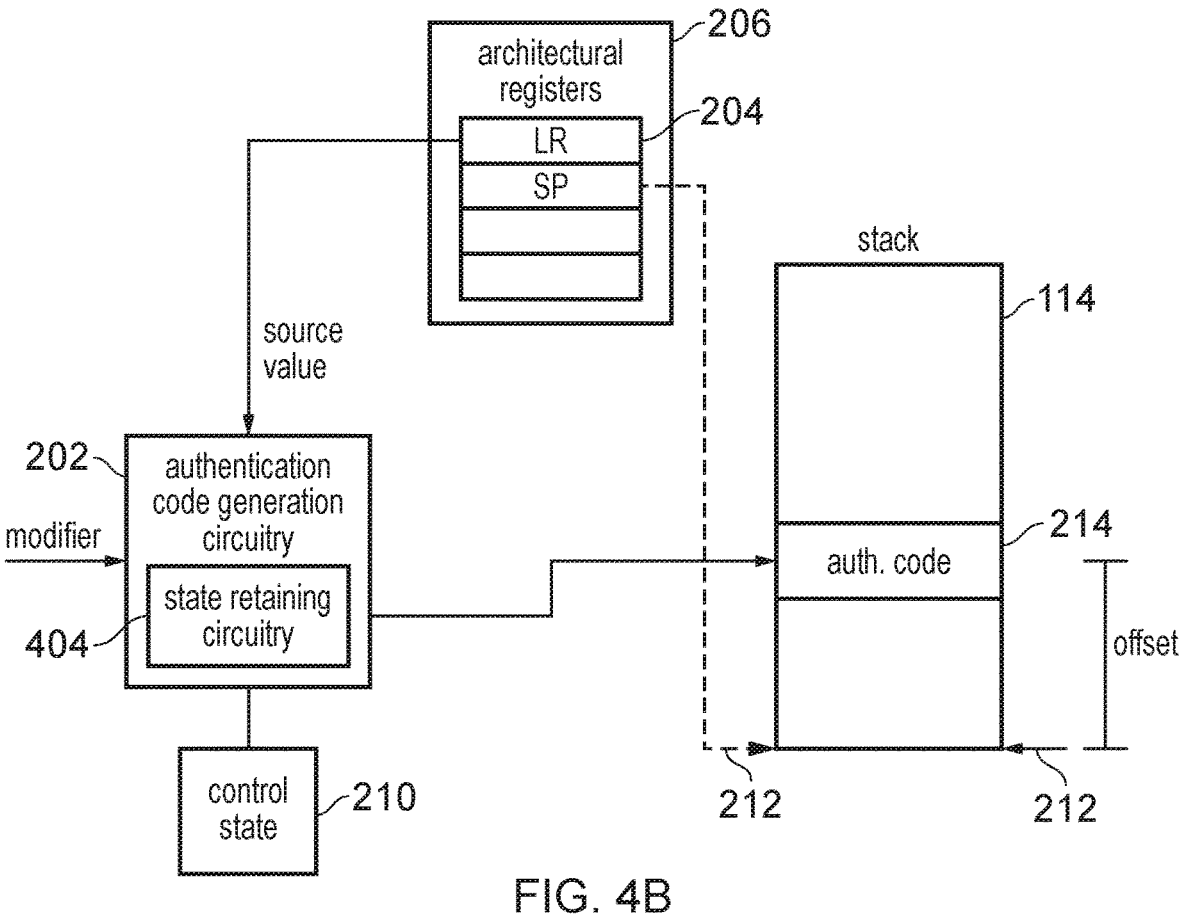

In some processing cores (particularly small, in-order processors) keeping the circuit area (e.g. gate count) low is considered to be a priority, and so in such systems adding an extra microarchitectural register or buffer may considered to be undesirable. While in many situations the improved performance achievable by implementing the present technique may be worth this small increase in circuit cost, FIGS. 4A and 4B illustrate an alternative approach that makes use of state retaining circuitry 225 and 404 already present in the authentication code generation circuitry 202. FIG. 4A depicts an iterative authentication code generating circuit that holds the initial input and intermediate results in state retaining circuitry 225. Multiplexer 221 is controlled by control input A 229 to select the value to be loaded into the state retaining circuitry as being either the initial input value or the output of cryptographic logic 226 that is fed back to allow use in a subsequent iteration. The state within the state retaining circuitry may be held constant under control of enable control C 222 or by clock stopping control B 224 which is used to create the gated clock 227. Once the circuit has completely sufficient iterations of the cryptographic logic to generate the authentication code on output 228, the control signal B or C can be used to hold the contents of the state retaining circuitry fixed for multiple clock cycles, which will hold the output 228 fixed for multiple clock cycles until it can be written to the memory system. The method of controlling the clock retaining circuitry can be selected by the circuit implementer as one of the two options shown here or by other conventional means. FIG. 4B shows the authentication code generating circuitry of FIG. 4A in a larger system. The authentication code generation circuitry 202 of this example is configured in the same way as in the previous examples, and generates the authentication code in the same way. However, in this example, the authentication code does not need to be temporarily held in a buffer or an architectural register once it has been generated by the authentication code generation circuitry 202. Instead, state retaining circuitry 404 within the authentication code generation circuitry is arranged to maintain state information indicative of the authentication code for at least one cycle after the cycle in which the code is generated. For example, the state retaining circuitry 404 may include a number of flip-flops which may retain the authentication code itself for a number of cycles after it is generated (e.g. because the cryptographic algorithm is an iterative procedure and the state retaining circuitry is used in earlier iterations to hold the intermediate state as input to a subsequent iteration, so after the final iteration that state retaining circuitry holds the final result for the authentication code). Hence, the authentication code storing micro-operation could simply read the code from the state retaining circuitry 404 and store the authentication code to the stack 114. This allows the present technique to be implemented without requiring the extra hardware logic to implement a temporary register or buffer to hold the authentication code.

As in the previous examples, from the perspective of the architecture, the authentication code is stored directly to the stack 114 once it has been generated. Therefore, the advantages discussed above of generating and storing the authentication code in response to a single authentication code generation instruction are provided.

This approach of temporarily holding the authentication code in state retaining circuitry 404 of the authentication code generation circuitry 202 is particularly beneficial in an in-order processor. Because the authentication code generation instruction is expected to be followed by an instruction to push the contents of the link register 204 to the stack 114, in an in-order processor it is very unlikely that another authentication code will need to be generated in the next cycle, meaning that it is possible to temporarily hold the authentication code (or corresponding inputs/intermediate values) in the state retaining circuitry 404 without impacting the performance of a subsequent authentication code generation instruction by the authentication code generation circuitry 202. Moreover, since it is expected that only a single authentication code generation instruction will be executed for each function processed by the processing circuitry 108, occupying the state retaining circuitry 404 with holding the most recently generated authentication code for a small number of clock cycles will be very unlikely to cause execution of a subsequent authentication code generation instruction to be delayed.

Figure 5:
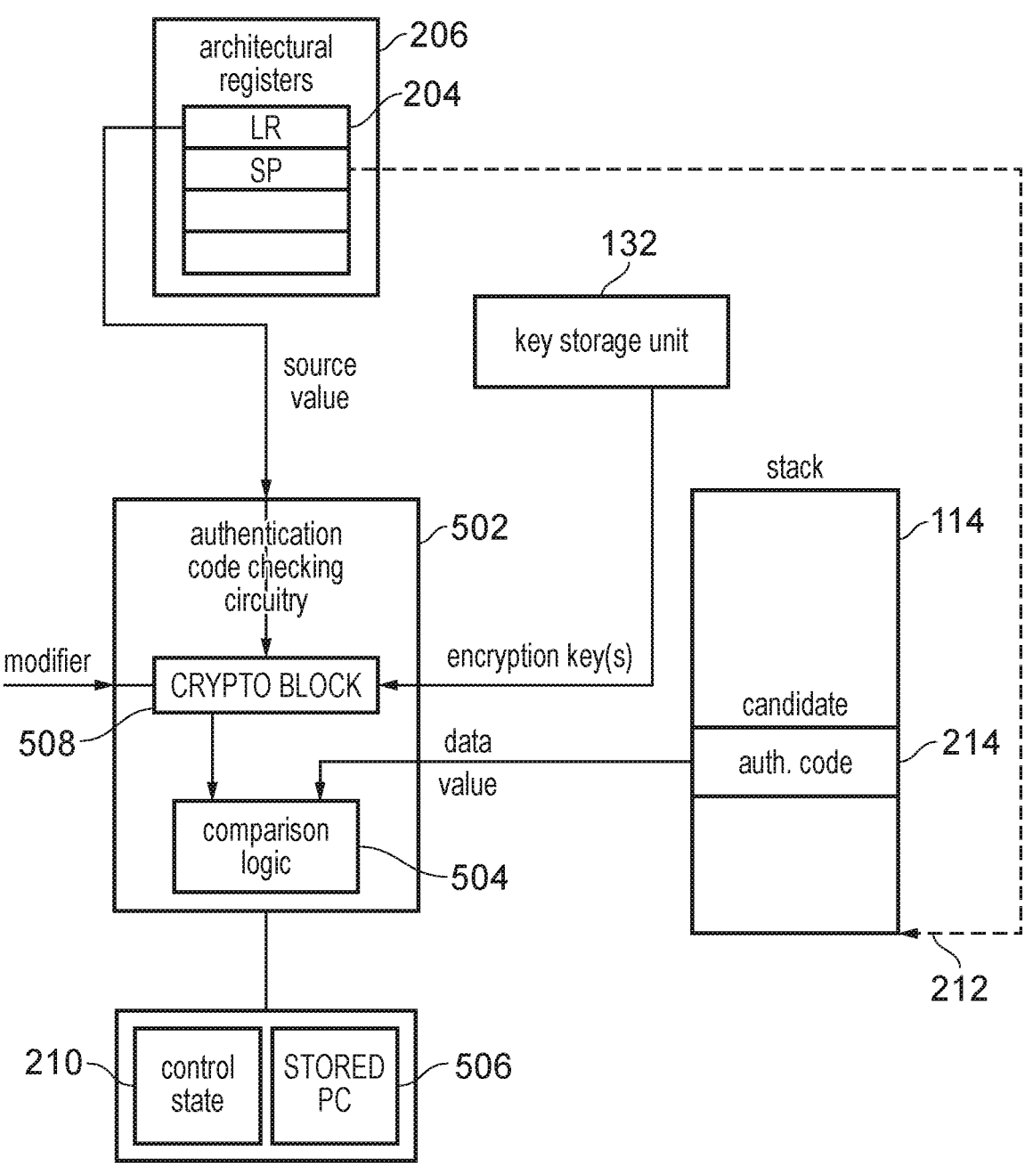

FIG. 5 shows an example of an apparatus for checking a data value read from the authentication code storage location 214 in the stack 114 against an expected authentication code. For example in some software use cases, prior to returning from a function, the candidate function return address may be read from the stack 114 and returned to the link register 204. The candidate function return address can be validated by executing the authentication code checking instruction, which will generate an expected authentication code from the candidate function return address. The data value read from the authentication code storage location 214 may then be checked against the expected authentication code to determine whether the function return address may have been tampered with (e.g. overwritten).

In this example, in response to decode circuitry (not shown) decoding an authentication code checking instruction:

A. the current value of the program counter (e.g. the value of the program counter corresponding to the authentication code checking instruction) is stored to a storage location 506, separate from any program counter register that may also be provided;

B. a source value (for example, a candidate function return address) is read from the link register 204;

C. the authentication code checking circuitry 502 uses the source value, an (optional) modifier value, and an (optional) encryption key from key storage unit 132 to generate an expected authentication code in cryptographic block 508 according to the techniques discussed above;

D. comparison logic 504 is then arranged to compare the expected authentication code with the data value read from the authentication code storage location 214 in the stack 114 (wherein the data value is expected to be a previously generated authentication code); and E. if the values match, processing is permitted to continue (e.g. by executing the code identified by the function return address). On the other hand, if a mismatch is detected, an error handling response is triggered. In the case where the error handling response is triggered, the stored value of the program counter 506 can be made available to software or made accessible via a debug interface so that it can be used to identify the instruction which triggered the error handling response.

The storing and making available of the address of the authentication code checking instruction is particularly useful if subsequent instructions have been allowed to begin executing before execution of the authentication code checking instruction has completed. For example, because the generation of the expected authentication code may take a long time (e.g. if it is generated using an iterative cryptographic process), several subsequent instructions may have been permitted to begin execution before the authentication code checking instruction is complete. This means that if a mismatch is detected between the expected authentication code and the data value read from the stack, triggering an error handling response, it can be difficult in debugging to attribute the cause of the fault to the specific instance of the authentication code checking instruction in the program. Therefore, storing the value of the program counter corresponding with the authentication code checking instruction during the execution of the authentication code checking instruction so that it can be made available to software simplifies debugging in the software development phase, or in forensic examination of attempted ROP attacks.

Checking the data value read from the authentication code storage location 214 in the stack 114 against an expected authentication code in this way allows the apparatus to guard against security exploits such as ROP attacks. Moreover, the apparatus in this example is arranged to read the data value from the stack 114, compute an expected authentication code and compare the two, all in response to a single instruction. This means that the data value does not need to be stored to an architectural register between being read from the stack 114 and being compared with the expected authentication code. Thus, the performance benefits discussed above of not storing the data value in an architectural register are achieved.

Figure 6:
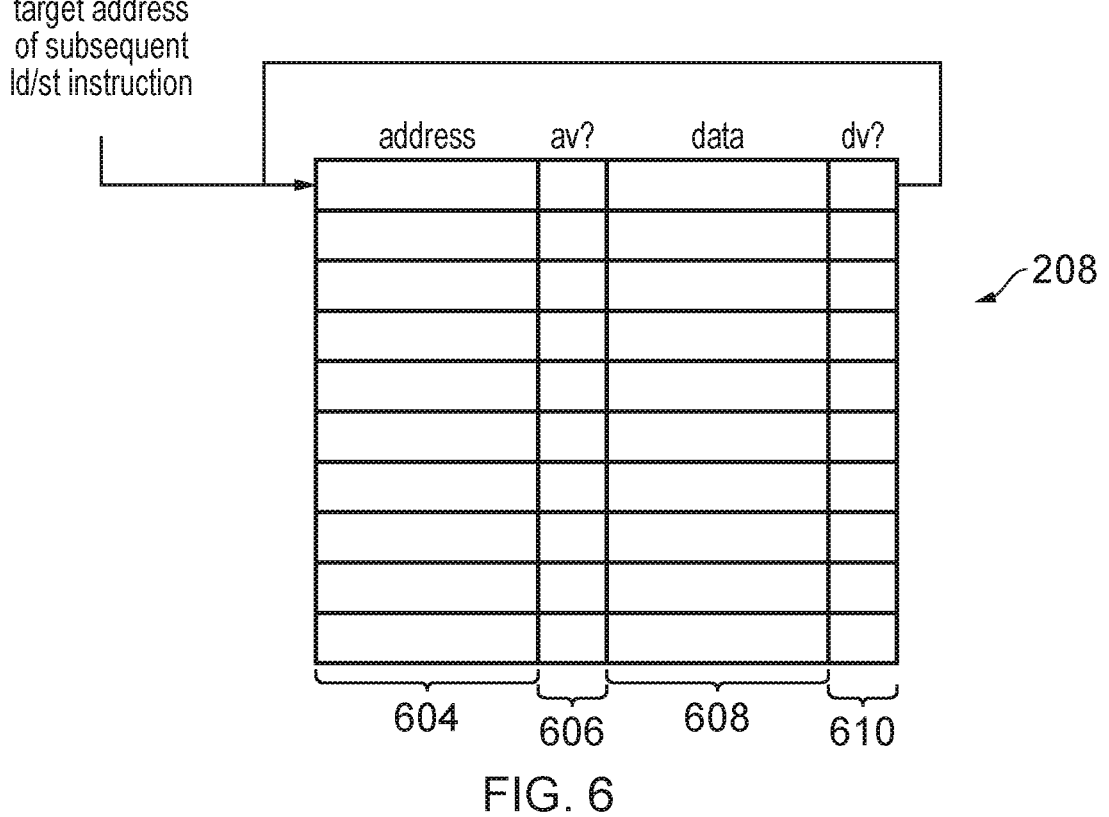

FIG. 6 shows an example of the buffer 208 described in FIG. 2, for storing an authentication code. The buffer 208 may be a buffer already provided in the data processing apparatus for preventing ordering hazards between load and store instructions, and includes an address field 604 for storing an address in memory at which an authentication code is to be stored (which might be in the stack), an address valid field "av" 606 for storing a value indicative of whether a valid address is stored in the address field 604, a data field 608 for storing a generated authentication code, and a data valid field "dv" 610 for storing a value indicative of whether a valid authentication code is stored in the data field 608.

When an authentication code generating instruction is decoded by decode circuitry, the address field 604 is populated to indicate the store address at which the authentication code will be stored, and the address valid field 606 is populated to indicate that the address is valid, and the data valid field indicates that the data field is not valid. This, therefore, indicates that an authentication code is in the process of being generated. Once the authentication code has been generated, the data field 608 is populated with the authentication code, and the data valid field 610 is populated to indicate that the authentication code is valid, and the buffer entry is ready to be written to memory as soon as the memory system can accept the write transaction. Once the authentication code has been stored to memory, both the address field 604 and the data field 608 may be invalidated by setting the address valid field 606 and the data valid field 610 to indicate that the corresponding address and data fields 604, 608 are invalid. Alternatively, the entry may be retained in the buffer, allowing it to be used as a small cache of authentication codes, or as an authentication code stack, that can save power in the system by providing authentication codes when possible, in response to instructions that seek to load them from memory, and thus reducing power consumption and memory bandwidth.

The buffer 208, when arranged in this way, enables subsequent instructions (e.g. instructions following the authentication code generation instruction) to be executed correctly, avoiding timing hazards. For example, if a subsequent instruction is a load or store instruction, its target address may be compared with the address fields 604 in the buffer 208 whose corresponding valid bits 606 indicate that the address field is valid. If the target address matches a valid address stored in the buffer 208, processing of the subsequent instruction may be stalled until the authentication code is available (e.g. stored in the data field 608 or stored to the stack). Additionally, if the subsequent instruction is a load instruction, once a valid authentication code is stored in the buffer 208, the authentication code may be read directly from the buffer 208 and returned as the result of the load operation, avoiding the need for a memory access. In this way, subsequent instructions may be executed without returning incorrect results in machines where the generation of the authentication code in the cryptographic hardware is a multi-cycle computation.

It should be noted that although the buffer 208 shown in FIG. 6 includes the four fields discussed above, it is also possible for the buffer 208 to only include the address field 604, the address valid field 606 and the data valid field 610. The data field 608 may be excluded provided that the data valid field 610 is included, since this will still provide enough information to allow a subsequent load or store instruction to determine whether an authentication code has been generated. However, providing the data field 608 is particularly advantageous, as it allows for store-to-load forwarding (e.g. reading the authentication code directly from the buffer 208 in response to a load instruction) or merging of store instructions.

The buffer 208 allows the authentication code to be generated using a very slow (multiple cycle) implementation of the cryptographic Function, while allowing the processor to continue to execute subsequent instructions. In such a system, to avoid errors, it is useful to be able to detect a situation where, before the authentication code has been generated, a subsequent instruction tries to access the same memory location in memory where the authentication code will be written. As discussed above, this subsequent instruction could, for example, be a load instruction attempting to read the authentication code, or a store instruction attempting to write to the same location.

In the case of a load instruction, since the authentication code generation circuitry has not yet generated the authentication code, the processor may stall and wait for the authentication code to be generated.

In the case of a store instruction, it is advantageous to provide a mechanism to avoid the stores (e.g. the store in response to the authentication code generation instruction and the store in response to the subsequent instruction) happening in the wrong order. A simple solution is to stall the processor as above, allow the execution of the authentication code generation instruction to complete—including writing the authentication code to the stack—and then perform the store operation generated by the subsequent instruction. This simple approach is acceptable since it maintains the correct ordering of the stores, and because this situation (of a subsequent store instruction targeting the same address as the authentication code generation instruction being executed before the authentication code has been stored) is expected to be rare—if such as situation does occur, it is likely to be due to a programming error, for example, because it makes little sense for a program to generate an authentication code and then overwrite the value shortly after, before reading it back from memory with a load instruction.

The buffer 208 is able to provide these advantages (e.g. of allowing the processor to detect a conflict between a subsequent load/store instruction and the authentication code generation instruction) because the store address for storing the authentication code is typically generated quickly, so the address field 604 and the address valid bit 606 can be quickly populated before subsequent instructions are executed. When executing the authentication code generation instruction it is preferable that the cycle timing of the generation of the target address in memory is the same as normal store instructions, so that the same exception checking logic and ordering hazard detection logic that is used for normal store instructions can be used for the authentication code generation instruction. In a typical CPU pipeline, this means that the authentication code generation instruction can provide the above advantages with only one cycle latency of execution (e.g. it only delays the start of the following instruction by one cycle). These advantages can be achieved with just the address field 604, the address valid field 606 and the data valid field 610—the data field 608 is not required for providing these particular advantages.

However, as noted above, the buffer 208 can be particularly advantageous if it also includes the data field 608, which will receive the authentication code when it has been generated. This data field 608 may additionally receive data stored by other store instructions if this buffer 208 is also used as a write buffer for normal store instructions.

Once the data valid bit 610 is also set, the processor can try to write the data out to the memory hierarchy (e.g. to the stack) as normal, as the address and the data are both available. This is similar to the process followed in response to a normal store instruction and can involve caches, a memory management unit (MMU) translation lookaside buffers (TLBs) or memory protection unit checks, depending on the specific implementation.

Also, if a subsequent load instruction is waiting to read the authentication code and the data and address are still in the buffer 208, the processor can provide the authentication code directly from the buffer 208 to the load instruction. This approach may be appropriate if this situation (a subsequent load instruction targeting the same address as an authentication code generation instruction which has not yet completed) is expected to be frequent enough to justify the addition the necessary logic to the processor, or if the buffer is used as a cache or authentication code stack as described above. This approach may also be appropriate if the buffer is also used for other types of store instructions which write data to memory, so that many different store-followed-by-load scenarios can benefit from being able to return data from the buffer to a load instruction.

Alternatively, if it is not considered important to increase the speed of execution of load instructions in this case (for example, if the situation is expected to be rare), the processor may instead simply stall the subsequent load instruction until the store value has been written to the memory hierarchy, and then perform the load as usual. In this arrangement, depending on the details of the implementation, the data field 608 may not be needed.

Figure 7:
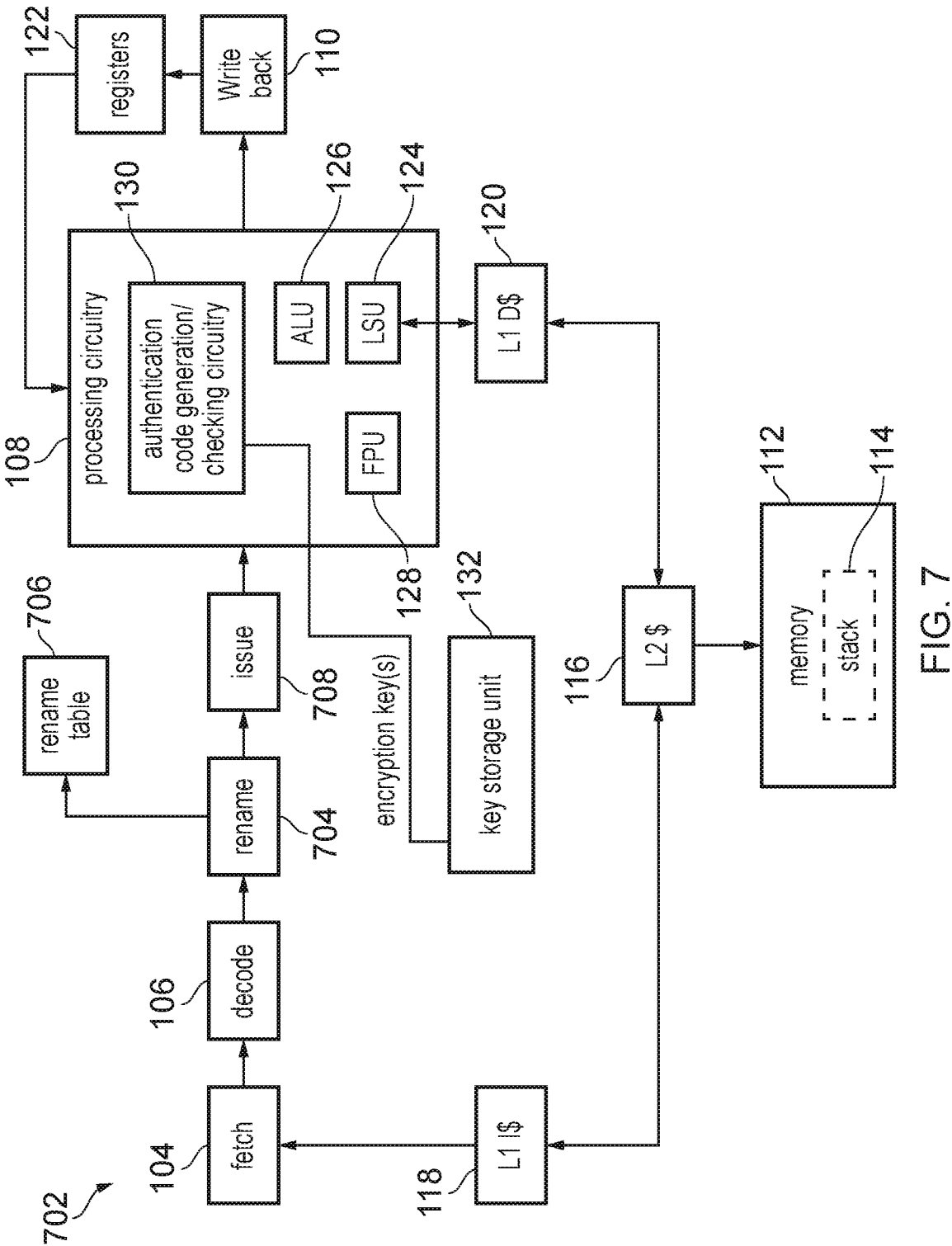

FIG. 7 shows another example of a data processing system 702 in which the present technique may be implemented. In particular, the data processing system 702 of FIG. 7 is an out-of-order processor, meaning that it is able to execute instructions outside of the program order. The data processing system 702 includes all of the elements of the in-order processor 102 of FIG. 1, with the addition of register rename circuitry 704, a rename table 706 and issue circuitry 708. The issue circuitry 708 is arranged to issue instructions to the processing circuitry 108 for execution. The issue circuitry 708 may issue the instructions in an order that is different from the program order, in order to improve the performance of the data processing system 702. The register rename circuitry 704 in conjunction with the rename table 706 is arranged to remap register references in instructions to microarchitectural registers 122 in hardware, e.g. to eliminate false data dependencies between independent instructions writing to the same architectural register due to having to reuse that architectural register due to register pressure. The register renaming circuitry 704 may also be arranged to identify a microarchitectural register to be used as the temporary register (RTemp) for storing the authentication code, when the example of FIG. 3 is used. For example, RTemp may be any of the microarchitectural registers 122 not currently mapped to one of the architectural registers available for referencing by instructions decoded by the instruction decoder 106, so that the use of the temporary register does not contribute to increased register pressure.

As in the in-order processor of FIG. 1, the data processing system 702 of FIG. 7 is arranged to implement the present technique using authentication code generation/checking circuitry 130. Thus, the advantages of the present technique can also be achieved in an out-of-order processor.

Figure 8:
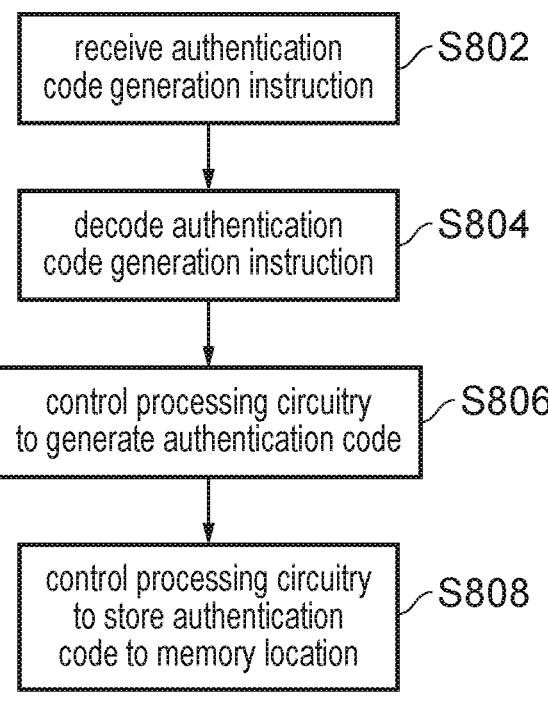
FIG. 8 is a flow diagram illustrating an example of a method of generating and storing an authentication code.

FIG. 8 is a flow diagram illustrating a method of generating an authentication code in accordance with examples of the present technique. In FIG. 8, an authentication code generation instruction is received S802 and decoded S804. In response to the decoded authentication code generation instruction, processing circuitry is controlled to generate the authentication code S806 and store the authentication code to a memory location associated with a store address formed using a value obtained from a register (a store address source value providing register) S808. In one particular example, the memory location could be a location on the stack, and the store address source value providing register may be a stack pointer register. As discussed in previous examples, the authentication code may be generated using a source value read from a register and a modifier value, and may be temporarily held in either state retaining circuitry, a buffer or a temporary register before being stored to the stack.

Figure 9:
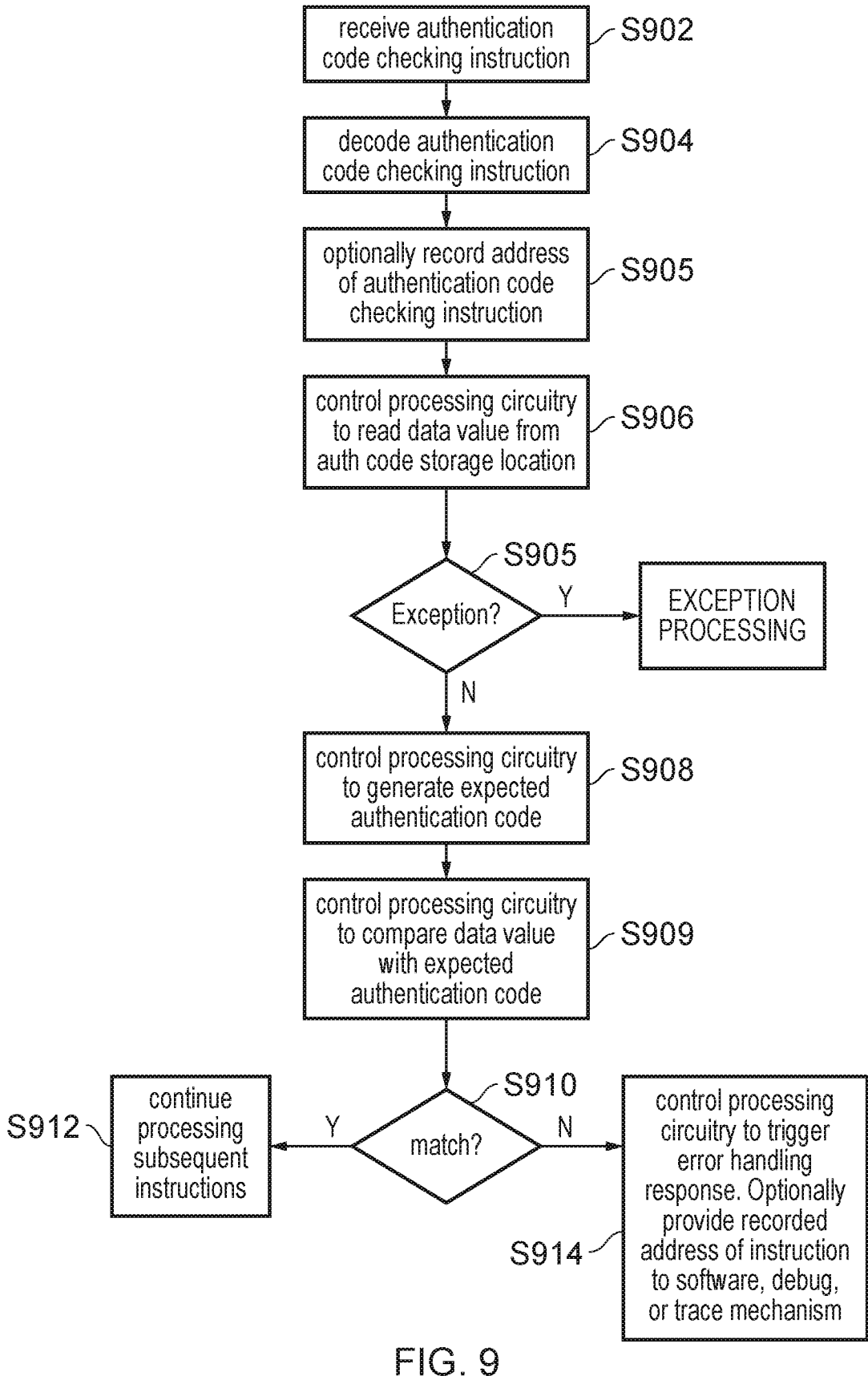
FIG. 9 is a flow diagram illustrating an example of a method of checking an authentication code.

FIG. 9 is a flow diagram illustrating a method of executing an authentication code checking instruction in accordance with examples of the present technique. In FIG. 9, an authentication code checking instruction is received S902 and decoded S904. In response to the decoded authentication code checking instruction, processing circuitry is controlled to:

S905 (optional) store the address of the authentication code checking instruction in a microarchitectural register or flipflop and retain it for at least the duration of execution of the authentication code checking instruction so that the address is available at step S914;

S906 read a data value from an authentication code storage location at a memory location associated with a load address formed using a value obtained from a register (a load address source value providing register). In one particular example, the memory location may be a location on the stack, and the load address source value providing register may be a stack pointer register;

S907 If an exception was signalled by the memory system, a memory protection unit, or a memory management unit, cease execution of this instruction and signal an exception, otherwise continue to step S908;

S908 Compute an authentication code in authentication code generating circuitry 202 which computes a cryptographic Function on the second source value (which may be an architectural register e.g. a link register), optionally using a modifier (which may be an architectural register e.g. a stack pointer register), and encryption keys;

S909 compare the data value with an expected authentication code. In one particular example, the memory location may be a location on the stack, and the load address source value providing register may be a stack pointer register;

S910 The processing circuitry determines whether the data value and the expected authentication codes match and, if they do, processing continues at S912. On the other hand, if the data value and the authentication code do not match, the processing circuitry is controlled to trigger an error handling response S914;

S912 Execution of the authentication code checking instruction is complete, and execution continues with subsequent instructions;

S914 Error handling response is triggered. For example, the error handling response could include triggering the taking of an exception by the processing circuitry, or recording the error in a status register, or taking a branch to error handling code. Optionally, the address of the authentication code checking instruction that was stored into in a microarchitectural register or flipflop at S905 may made available to software or to a debug or trace mechanism to enable debugging and forensic analysis;

In FIG. 9, "optional" means that the designer of the CPU has the option to include or not include any step marked "optional", or any Function input marked "optional".

Figure 10:
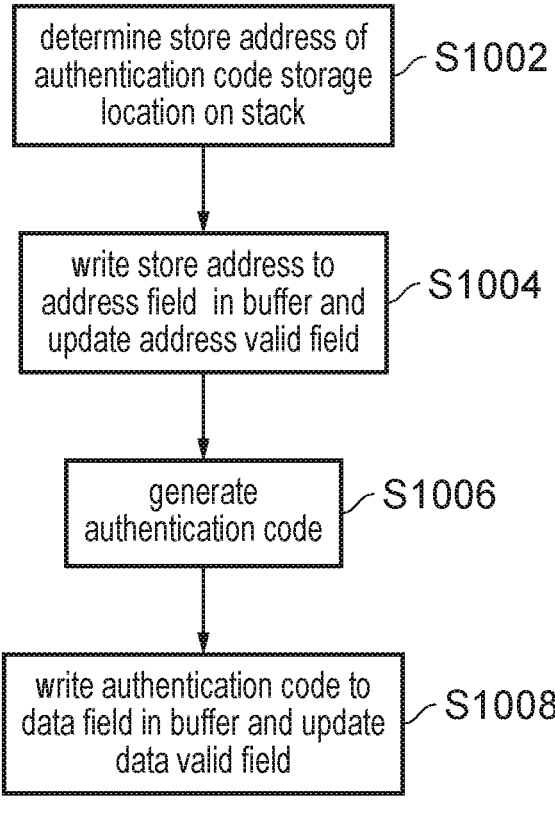
FIG. 10 is a flow diagram illustrating an example of a method of populating a buffer such as that illustrated in FIG. 6.

FIG. 10 is a flow diagram illustrating a method of populating a buffer such as the buffer 208 of FIGS. 2 and 6. In the method of FIG. 10, the store address of the authentication code storage location on the stack is determined S1002, in response to which the store address is written to the address field in the buffer and the address valid field is updated accordingly S1004. In addition, the authentication code is generated S1006, in response to which the authentication code is written to the data field of the buffer and the data valid field is updated accordingly S1008.

Figure 11:
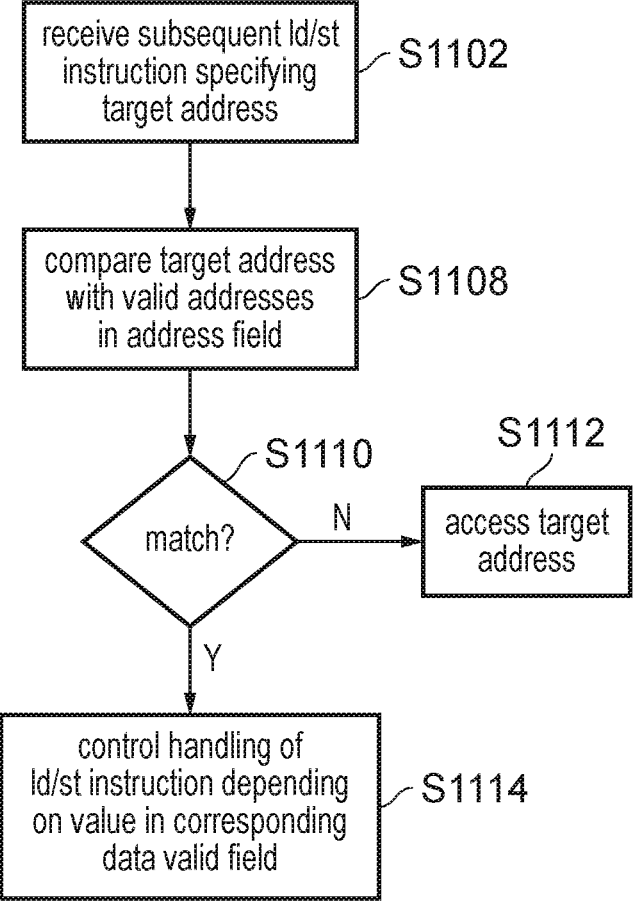
FIG. 11 is a flow diagram illustrating an example of handling execution of subsequent load/store instructions before execution of the authentication generation instruction has completed.

FIG. 11 is a flow diagram illustrating a method of using the buffer 208 shown in FIGS. 2 and 6. We define the term "valid address" to mean an address held in an address field of buffer 208 whose corresponding address valid field 606 in buffer 208 has the value True. When a subsequent load or store instruction (e.g. a load or store instruction following the authentication generation instruction in program order) is received S1102, processing circuitry compares the target address specified by the load or store instruction with all valid addresses stored in buffer S1108. At S1110 if there are no matches then the method continues at S1112 where the load or store instruction accesses the memory hierarchy in the conventional manner in order to access the target address. On the other hand, if there is a match at S1110, then the method continues at S1114 where the processing circuitry controls handling of the load or store instruction depending on the value in the data valid field that corresponds to any valid address which matched the target address S1114.

For example, handling of the load or store instruction in step S1114 could involve, if the authentication code is not yet available (e.g. if the data valid bit is not set) stalling the pipeline until the authentication code becomes available. If the authentication code is available (the data valid bit is set) and the instruction is a load instruction, this step could involve either stalling until the authentication code has been stored to memory, or providing the authentication code directly from the store buffer—this would require the buffer to also include a data field for storing the authentication code once generated. Similarly, if the instruction is a store instruction and the authentication code is available (if the data valid bit is set), step S1114 could involve either stalling the pipeline until the authentication code has been stored to memory, or allowing the store data specified by the store instruction to be merged with the authentication code (overwriting all or part of the authentication depending on the data width specified by the store instruction)—again, this approach requires a data field to be provided.

FIG. 12 illustrates an example of the authentication code generation instruction 1200 of the present technique. In this example, the authentication code generation instruction (PACSTR) 1200 is decoded by the instruction decoder to control the processing circuitry to generate an authentication code based on a source value read from a link register (LR), and store the authentication code to a location in memory having an address derived from a value stored in a stack pointer register (SP). The authentication code generation instruction in this example is split into two micro-operations—an authentication code generation micro-operation 1202 and an authentication code storing micro-operation 1204. The authentication code generation micro-operation (PAC) of this example 1202 is executed by authentication code generation circuitry to generate the authentication code and store it to a temporary register (Rtemp). It will be appreciated, however, that this is just an example and the authentication code could instead be stored in a buffer or retained in state retaining circuitry in the authentication code generation circuitry. The authentication code storing micro-operation (STR) 1204 is then executed by the processing circuitry to retrieve the authentication code from Rtemp (for example) and store it to the stack.

It will be appreciated that the authentication code generation instruction shown in FIG. 12 is just an example, and other formulations of the instruction and the associated micro-operation are also covered by the scope of the claims.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In the example of FIG. 13, these include instruction decoding program logic 1312 simulating the decode circuitry described in the above examples, and register emulating 1316 logic to maintain a data structure (within the memory or registers of the host apparatus) which represents (emulates) the registers of the instruction set architecture (ISA) being simulated by the program. The emulated registers may include any of the registers described above, including the program counter register, the link register, the stack pointer register, a source value register, the first source value register, the second source value register, a temporary register RTemp, a status register, a store address source value providing register and/or the a load address source value providing register, for example. Authentication code generation/checking logic 1314 is also provided, simulating the authentication code generation and/or checking circuitry described in the above examples. In arrangements where one or more of the hardware elements referenced in the previously described embodiments are present on the host hardware (for example, host processor 1330), some simulated embodiments may make use of the host hardware, where suitable. For example, host processor 1330 may contain in hardware caches that perform the function of the caches 116, 118, and 120 of FIG. 1.

In response to an authentication code generation instruction in the target code 1300, the required operands may be read from the data structure in host memory or host registers which emulate the architectural registers of the ISA with which the target code is written. These operands include the source value (e.g. a function return address read from a link register) from which the authentication code is to be generated, and an address source operand used to derive the store address of the memory location at which the authentication code is to be stored (e.g. this operand could be a value obtained from a stack pointer register). The authentication code generation instruction may then be mapped by the instruction decoding program logic 1312 to a set of instructions in a native host instruction set supported by the host hardware 1330, with the mapped set of instructions in the native instruction set implementing the authentication code generation Function.

Once the authentication code has been generated, the store of the authentication code to memory (e.g. to the stack) is then simulated by simulating translation of a virtual address (the store address generated relative to the stack pointer) to a physical address in a simulated address space (if address translation is supported for the simulated target code). The simulated physical address is then mapped to a host virtual address in the host address space, and a store instruction is then issued in the native instruction set to store the calculated authentication code to the determined host virtual address. This may also involve the host hardware or host OS translating the host virtual address to a host physical address.

Similarly, in response to the instruction decoding program logic 1312 decoding an authentication code checking instruction in the execution instruction stream of target code 1300, the authentication code checking instruction may then be mapped by the instruction decoding program logic 1312 to a set of instructions in the native host instruction set which implement the authentication code checking instruction in the simulated execution environment using register emulation logic 1316 and authentication code generation/checking logic 1314. The set of instructions will read a source value (e.g. the candidate function return address) from a host memory location or host register used by the register emulating program logic 1316 to emulate an architectural register referenced by the authentication code checking instruction for providing the source value. The set of instructions will also read a further data value (e.g. a candidate authentication code) from a location in host memory that corresponds to an address in a simulated address space that corresponds to the load address derived from operands of the authentication code checking instruction. The set of instructions will implement the authentication code checking Function to compute an expected authentication code based on the source value, and then compare the expected authentication code with the further data value read from memory, and trigger an error handling response if the expected authentication code and the further data value do not match.

The simulator program 1310 may be stored on a computer-readable storage medium (which may be a non-transitory medium), and provides a program interface (instruction execution environment) to the target code 1300 (which may include applications, operating systems and a hypervisor) which is the same as the application program interface of the hardware architecture being modelled by the simulator program 1310. Thus, the program instructions of the target code 1300, including the authentication code generating instruction and the authentication code checking instruction described above, may be executed from within the instruction execution environment using the simulator program 1310, so that a host computer 1330 which does not actually have the hardware features of the apparatus 102, 702 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the operation. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

processing circuitry configured to execute instructions; and decode circuitry configured to decode the instructions for execution by the processing circuitry;

wherein the decode circuitry is responsive to an authentication code generation instruction specifying a first source value to control the processing circuitry to:

generate an authentication code dependent on the first source value; and store the authentication code to a memory location associated with a store address formed using a value obtained from a register; and wherein the authentication code generation instruction is a single instruction;

wherein the decode circuitry is further responsive to the authentication code generation instruction to generate:

an authentication code generation micro-operation to control the processing circuitry to generate the authentication code; and an authentication code storing micro-operation to control the processing circuitry to store the authentication code to the memory location associated with the store address;

wherein the processing circuitry comprises authentication code generation circuitry configured to generate the authentication code in response to the authentication code generation micro-operation, the authentication code generation circuitry comprising state retaining circuitry to maintain state information indicative of the authentication code for at least one cycle after a cycle in which the authentication code was generated; and wherein the processing circuitry is responsive to the authentication code storing micro-operation to retrieve from the authentication code generation circuitry the authentication code that has been preserved as a consequence of the state retaining circuitry retaining state, prior to storing the authentication code to the memory location associated with the store address.

2. The apparatus of claim 1, wherein:

the first source value comprises a value obtained from a source value register.

3. The apparatus of claim 2, wherein:

the source value register is a link register; and the processing circuitry is responsive to a function call instruction to store a function return address into the link register.

4. The apparatus of claim 1, wherein:

the processing circuitry is configured to inhibit taking of an exception between execution of the authentication code generation micro-operation and execution of the authentication code storing micro-operation.

5. The apparatus of claim 1, wherein:

the processing circuitry is configured to store the authentication code in a temporary storage location, prior to storing the authentication code to the memory location associated with the store address.

6. The apparatus of claim 5, wherein the temporary storage location comprises one of:

an architecturally invisible register; or a buffer.

7. The apparatus of claim 5, wherein:

the temporary storage structure comprises a buffer comprising at least one entry comprising at least an address field, an address valid field and a data value valid field;

the processing circuitry is configured to:

write the store address into the address field, and set the address valid field to indicate that the address field is valid, prior to completing generation of the authentication code; and update the data value valid field to indicate that a data value corresponding to the store address is valid when the authentication code has been generated; and the processing circuitry is configured to begin execution of one or more subsequent instructions prior to completion of generation of the authentication code, and when the one or more subsequent instructions includes a subsequent load/store instruction, the processing circuitry is configured to compare a target address identified by the subsequent load/store instruction with the store address stored in the address field, and when the target address matches the store address and the address field is indicated as valid, to control handling of the subsequent load/store instruction depending on whether the data value valid field indicates that the data value corresponding to the store address is valid.

8. The apparatus of claim 1, wherein:

in response to the authentication code generation instruction, the decode circuitry is configured to control the processing circuitry to form the store address using a value obtained from a stack pointer register.

9. The apparatus of claim 8, wherein:

the processing circuitry is configured to store the authentication code to the store address without modifying the stack pointer.

10. The apparatus of claim 9, wherein:

the store address is formed by adding an offset amount to the stack pointer.

11. The apparatus of claim 1, wherein:

the processing circuitry comprises an in-order processor, adapted to begin execution of each of the instructions in a program order.

12. The apparatus of claim 1, wherein:

the processing circuitry comprises an out-of-order processor adapted to support execution of the instructions in a different order to a program order.

13. The apparatus of claim 12, wherein:

the processing circuitry is configured to store the authentication code in a temporary register allocated by register renaming circuitry, prior to storing the authentication code to the memory location associated with the store address, the temporary register comprising a register not currently mapped to an architectural register.

14. The apparatus according to claim 1, wherein:

the authentication code generation instruction specifies a modifier value; and the processing circuitry is configured to generate the authentication code using a cryptographic function, dependent on the first source value and the modifier value.

15. The apparatus of claim 14, wherein the cryptographic function comprises an iterative process performed over multiple cycles.

16. The apparatus of claim 1, wherein;

the decode circuitry is responsive to an authentication code checking instruction specifying a second source value to control the processing circuitry to:

read a data value from a second memory location associated with a load address formed using a value obtained from a register;

generate an expected authentication code dependent on the second source value;

compare the data value with the expected authentication code; and trigger an error handling response when a mismatch is detected between the data value and the expected authentication code;

wherein the authentication code checking instruction is a single instruction.

17. The apparatus of claim 1, wherein:

the apparatus is configured to operate according to a load/store architecture.

18. A method comprising:

in response to an authentication code generation instruction specifying a first source value, controlling processing circuitry to:

generate an authentication code dependent on the first source value; and store the authentication code to a memory location associated with a store address formed using a value obtained from a register;

wherein the authentication code generation instruction is a single instruction;

in further response to the authentication code generation instruction, generating:

an authentication code generation micro-operation to control the processing circuitry to generate the authentication code; and an authentication code storing micro-operation to control the processing circuitry to store the authentication code to the memory location associated with the store address;

generating the authentication code in response to the authentication code generation micro-operation and maintaining state information indicative of the authentication code for at least one cycle after a cycle in which the authentication code was generated; and in response to the authentication code storing micro-operation, retrieving the authentication code that has been preserved as a consequence of retaining state, prior to storing the authentication code to the memory location associated with the store address.

19. A non-transitory, computer-readable storage medium storing a computer program to control a host data processing apparatus to provide an instruction execution environment for execution of target code, the computer program comprising:

instruction decoding program logic to decode instructions of the target code to control the host data processing apparatus to perform data processing; and register maintenance program logic to maintain a register emulating structure in memory or in host registers which emulates registers of a target instruction set architecture of the target code;

wherein the instruction decoding program logic is responsive to an authentication code generating instruction to:

generate an authentication code dependent on the first source value; and store the authentication code to a memory address associated with a store address in a simulated address space, the store address being formed using a value obtained from the register emulating structure; and wherein the authentication code generation instruction is a single instruction;

wherein the instruction decoding program logic is responsive to the authentication code generation instruction to generate:

an authentication code generation micro-operation to control the host data processing apparatus to generate the authentication code; and an authentication code storing micro-operation to control the host data processing apparatus to store the authentication code to the memory location associated with the store address;

wherein the computer program comprises authentication code generation program logic to generate the authentication code in response to the authentication code generation micro-operation, the authentication code generation program logic comprising state retaining program logic to maintain state information indicative of the authentication code for at least one cycle after a cycle in which the authentication code was generated; and wherein the computer program is responsive to the authentication code storing micro-operation to retrieve from the authentication code generation program logic the authentication code that has been preserved as a consequence of the state retaining program logic retaining state, prior to storing the authentication code to the memory location associated with the store address.

20. An apparatus comprising:

processing circuitry configured to execute instructions; and decode circuitry configured to decode the instructions for execution by the processing circuitry;

wherein the decode circuitry is responsive to an authentication code checking instruction specifying a source value to control the processing circuitry to:

read a data value from a memory location associated with a load address formed using a value obtained from a register;

generate an expected authentication code dependent on the source value;

compare the data value with the expected authentication code; and trigger an error handling response when a mismatch is detected between the data value and the expected authentication code; and wherein the authentication code checking instruction is a single instruction;

wherein the decode circuitry is further responsive to an authentication code generation instruction to generate:

an authentication code generation micro-operation to control the processing circuitry to generate the authentication code; and an authentication code storing micro-operation to control the processing circuitry to store the authentication code to the memory location associated with the store address;

wherein the processing circuitry comprises authentication code generation circuitry configured to generate the authentication code in response to the authentication code generation micro-operation, the authentication code generation circuitry comprising state retaining circuitry to maintain state information indicative of the authentication code for at least one cycle after a cycle in which the authentication code was generated; and wherein the processing circuitry is responsive to the authentication code storing micro-operation to retrieve from the authentication code generation circuitry the authentication code that has been preserved as a consequence of the state retaining circuitry retaining state, prior to storing the authentication code to the memory location associated with the store address.

21. The apparatus of claim 20, wherein:

the processing circuitry is configured to record a program counter value associated with the authentication code checking instruction, and to make the recorded program counter value available to software or accessible via a debug interface after the triggering of the error handling response.

22. A method comprising:

in response to an authentication code checking instruction specifying a source value, controlling processing circuitry to:

read a data value from a memory location associated with a load address formed using a value obtained from a register;

generate an expected authentication code dependent on the source value;

compare the data value with the expected authentication code; and trigger an error handling response when a mismatch is detected between the data value and the expected authentication code;

wherein the authentication code checking instruction is a single instruction in further response to an authentication code generation instruction, generating:

an authentication code generation micro-operation to control the processing circuitry to generate the authentication code; and an authentication code storing micro-operation to control the processing circuitry to store the authentication code to the memory location associated with the store address;

generating the authentication code in response to the authentication code generation micro-operation and maintaining state information indicative of the authentication code for at least one cycle after a cycle in which the authentication code was generated; and in response to the authentication code storing micro-operation, retrieving the authentication code that has been preserved as a consequence of the state retaining circuitry retaining state, prior to storing the authentication code to the memory location associated with the store address.

23. A non-transitory, computer-readable storage medium storing a computer program to control a host data processing apparatus to provide an instruction execution environment for execution of target code, the computer program comprising:

instruction decoding program logic to decode instructions of the target code to control the host data processing apparatus to perform data processing; and register maintenance program logic to maintain a register emulating structure in memory or in host registers which emulates registers of a target instruction set architecture of the target code;

wherein the instruction decoding program logic is responsive to an authentication code checking instruction to:

read a data value from a memory location associated with a load address in a simulated address space, the load address being formed using a value obtained from the register emulating structure;

generate an expected authentication code dependent on the source value;

compare the data value with the expected authentication code; and trigger an error handling response when a mismatch is detected between the data value and the expected authentication code; and wherein the authentication code checking instruction is a single instruction;

wherein the instruction decoding program logic is responsive to an authentication code generation instruction to generate:

an authentication code generation micro-operation to control the host data processing apparatus to generate the authentication code; and an authentication code storing micro-operation to control the host data processing apparatus to store the authentication code to the memory location associated with the store address;

wherein the computer program comprises authentication code generation program logic to generate the authentication code in response to the authentication code generation micro-operation, the authentication code generation program logic comprising state retaining program logic to maintain state information indicative of the authentication code for at least one cycle after a cycle in which the authentication code was generated; and wherein the computer program is responsive to the authentication code storing micro-operation to retrieve from the authentication code generation program logic the authentication code that has been preserved as a consequence of the state retaining program logic retaining state, prior to storing the authentication code to the memory location associated with the store address.

* * * * *